(12) United States Patent
Shukla et al.

(10) Patent No.: US 11,532,996 B2
(45) Date of Patent: Dec. 20, 2022

(54) HYBRID MODULAR MULTILEVEL CONVERTER

(71) Applicant: Indian Institute of Technology Bombay, Mumbai (IN)

(72) Inventors: Anshuman Shukla, Mumbai (IN); Siba Kumar Patro, Gajapati (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 0 days.

(21) Appl. No.: 16/194,884

(22) Filed: Nov. 19, 2018

(65) Prior Publication Data

US 2019/0305691 A1    Oct. 3, 2019

(30) Foreign Application Priority Data

Mar. 28, 2018   (IN) .............................. 201821011623

(51) Int. Cl.
| | |
|---|---|
| *H02M 7/483* | (2007.01) |
| *H02M 7/537* | (2006.01) |
| *H02M 7/515* | (2007.01) |
| *H02M 1/14* | (2006.01) |
| *H02M 1/00* | (2006.01) |

(52) U.S. Cl.
CPC ............. *H02M 7/483* (2013.01); *H02M 1/14* (2013.01); *H02M 7/4835* (2021.05); *H02M 7/515* (2013.01); *H02M 7/537* (2013.01); *H02M 1/0095* (2021.05)

(58) Field of Classification Search
CPC ......... H02M 7/483; H02M 2007/4835; H02M 7/49; H02M 1/0095; H02M 1/14; H02M 7/515; H02M 7/537
See application file for complete search history.

(56) References Cited

U.S. PATENT DOCUMENTS

| | | | |
|---|---|---|---|
| 2013/0128629 A1* | 5/2013 | Clare ....................... | H02J 3/36 363/35 |
| 2014/0293668 A1* | 10/2014 | Trainer ................ | H02M 7/797 363/71 |
| 2015/0357931 A1* | 12/2015 | Oates ................... | H02M 7/493 363/89 |
| 2018/0367134 A1* | 12/2018 | Chivite-Zabalza ....................... H03K 17/102 |
| 2019/0199230 A1* | 6/2019 | Vasiladiotis .......... | H02M 5/225 |

* cited by examiner

*Primary Examiner* — Alex Torres-Rivera

(57) ABSTRACT

Accordingly, the embodiments herein provide a hybrid modular multilevel converter. The hybrid modular multilevel converter includes one or more chain links, one or more high voltage switches and a plurality of inductors. The one or more chain links are formed by sub modules. The one or more high voltage switches are formed by semi-controlled devices or fully controlled or any other suitable semiconductor devices. The plurality of inductors are arranged in the one or more chain links to limit circulating current among the one or more chain links. The one or more chain links are configured to enhance a power handling capability of the hybrid modular multilevel converter.

4 Claims, 16 Drawing Sheets

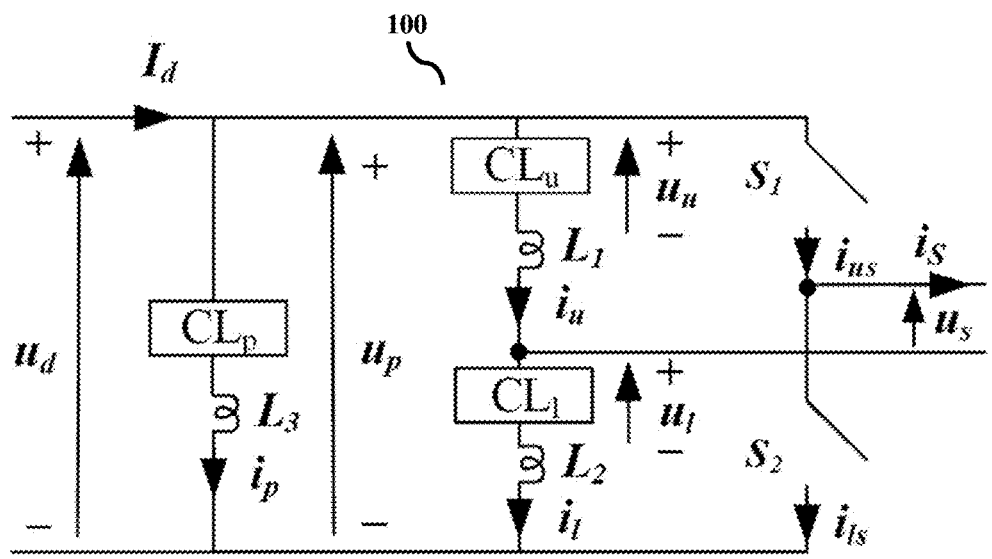
FIG. 2
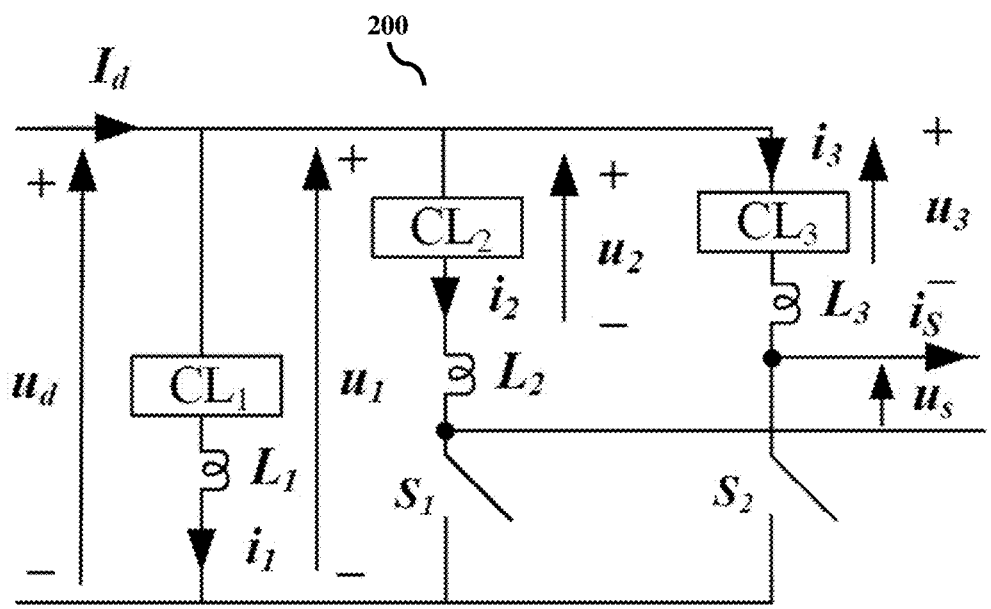

HYBRID MODULAR MULTILEVEL CONVERTER

TECHNICAL FIELD

The present disclosure relates to a converter, and more particularly to a hybrid modular multilevel converter (HMMC). The present application is based on, and claims priority from an Indian application No. 201821011623 filed on Mar. 28, 2018 the disclosure of which is hereby incorporated by reference herein.

BACKGROUND

High voltage direct current (HVDC) converters convert a high voltage electric power from an alternating current (AC) to a direct current (DC), or vice versa. Modular multilevel converters (MMCs) are a kind of HVDC converters gaining increasingly a prominence for high voltage applications (e.g., power distribution) due to its modular design, lower switching losses and being scalable to any voltage or power level. However, the MMCs require large sized capacitors for each of its sub module (SM). Further, the control of the MMCs may lose when a dc side fault occurs in the MMCs. Conduction loss and circulating current generation are generally higher in the MMCs during a high voltage conversion.

Various existing hybrid topologies such as an alternate arm converter (AAC) and a parallel hybrid converter (PHC) are proposed to address some of the aforementioned limitations. The AAC contains full bridge sub modules (FBSMs) in its circuits which generates a required output voltage. The AAC has a dc side fault blocking capability due to a presence of the FBSMs in its circuit. However, the conduction losses in the AAC increases as a number of IGBTs in a conduction path is higher. The PHC uses a minimum number of SMs and has a lower conduction losses as half bridge sub modules (HBSMs) are not in the a main conduction path. However, the PHC suffers from some major drawbacks such as coupling of the AC and the DC side of the converter, a loss of control during the dc side fault, etc.

The conduction loss in the converter is a major loss component for the MMCs based HVDC systems. The occurrence of the conduction loss mainly depends upon on-state voltage drop at thyristors/insulated gate bipolar transistors (IGBTs) present in the MMCs. The thyristors have a lower on-state voltage drop compared to that of the IGBTs, besides providing a higher power handling capability and a reliability. Moreover, the thyristors have a higher surge current handling capability which increases a short circuit strength of the MMCs. Recently, the MMCs made of hybrid combinations of the IGBTs and thyristors have been developed which makes the converter highly efficient. However, power handling capability of the thyristors are underutilized due to limited power handling capability of the IGBTs in existing hybrid combinations since same current flows through both the IGBTs and the thyristors during the high voltage conversion.

Thus, it is desired to address above mentioned disadvantages or other shortcomings or at least provide a useful alternative.

SUMMARY

Accordingly the embodiments herein provide a hybrid modular multilevel converter. The hybrid modular multilevel converter includes one or more chain links formed by sub modules, one or more high voltage switches formed by one of semi-controlled devices and fully controlled devices. A plurality of inductors are arranged in the one or more chain links to limit circulating current among the one or more chain links. The one or more chain links are configured to enhance a power handling capability of the hybrid modular multilevel converter.

In an embodiment, the one or more chain links is formed by connecting at least one of unipolar sub modules and bipolar sub modules.

In an embodiment, the unipolar sub modules comprises at least one of a direct current source and a storage element, wherein the bipolar sub modules comprises at least one of a direct current source and a storage element.

In an embodiment, the one or more chain links generate an output voltage.

In an embodiment, each phase of the hybrid modular multilevel converter comprises at least three chain links.

In an embodiment, each phase is connected in series or in parallel or in any mixed combination of series and parallel from the dc side with the other phase circuits.

In an embodiment, the one or more chain links in each phase is used for dc side voltage ripple minimization.

In an embodiment, the one or more chain links is controlled in such a way that at least two chain links are connected in parallel.

In an embodiment, at least two chain links are connected in parallel so as to share the current among the two or more chain links to enhance the power handling capability.

In an embodiment, at least two chain links are controlled in such a way that it provides a wide modulation index range, besides eliminating the requirement of any extra SMs.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This invention is illustrated in the accompanying drawings, throughout which like reference letters indicate corresponding parts in the various figures. The embodiments herein will be better understood from the following description with reference to the drawings, in which:

FIG. 1 illustrates a circuit diagram of a single phase HMMC, according to an embodiment as disclosed herein;

FIG. 2 illustrates a circuit diagram of the single phase HMMC, according to an embodiment as disclosed herein;

DETAILED DESCRIPTION OF EMBODIMENTS

Figure 3:
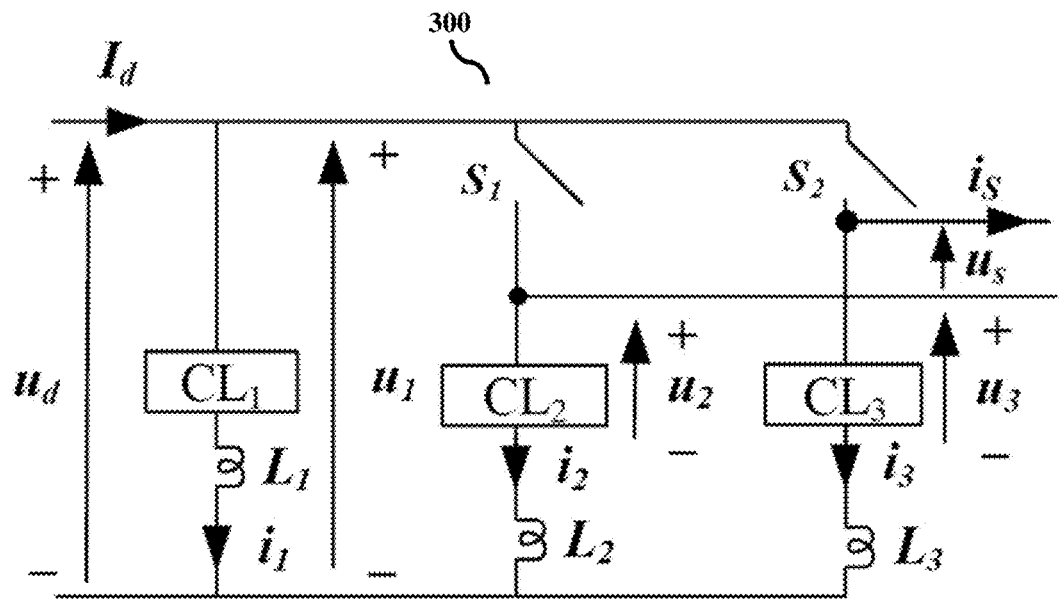
FIG. 3 illustrates a circuit diagram of the single phase HMMC, according to an embodiment as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a HMMC. The HMMC includes one or more chain links, one or more high voltage switches and a plurality of inductors. The one or more chain links are formed by sub modules. The one or more high voltage switches are formed by semi-controlled devices or fully controlled devices. The plurality of inductors are arranged in the one or more chain links to limit circulating current among the one or more chain links. The one or more chain links are configured to enhance a power handling capability of the hybrid modular multilevel converter.

Unlike conventional HMMC, thyristors in the proposed HMMC allow to pass a full amount of load current while IGBTs are allows to pass only a fraction of the load current. Thus the higher power handling capability of the thyristors is effectively utilized using the proposed HMMC.

Further, a peak current carried by the IGBTs is decreased due to a division of the load current. Hence, the IGBTs with a lower current rating can be used, which reduces an overall manufacturing cost of the HMMC.

In the proposed HMMC, chain links are not connected in series with the main conduction path. Hence conduction losses in the converter and the sub module capacitor size can be reduced, besides ensuring an effective utilization of the higher power handling capability of the thyristors.

The proposed HMMC have a better fault handling capability due to the use of thyristors. The thyristors have a higher surge current handling capability. Hence the thyristors can be used to carry a higher fault current till a circuit breaker operates.

Unlike conventional HMMC, the proposed HMMC can be used to enables a dc link voltage free from ripples by eliminating all 6n harmonics present in the dc link voltage.

Referring now to the drawings, and more particularly to FIGS. 1 through 40, there are shown preferred embodiments.

FIG. 1 illustrates a circuit diagram of a single phase HMMC 100, according to an embodiment as disclosed herein. In an embodiment, an input DC voltage which is further converted to AC output voltage $u_s$ by the single phase HMMC 100.

In an embodiment, the single phase HMMC 100 includes a DC link voltage $u_d$, a parallel chain link $CL_p$, a upper chain link $CL_u$ and a lower chain link $CL_l$, three small arm inductors $L_1$, $L_2$ and $L_3$ and two high voltage switches $S_\beta(\beta=1$ or $2)$.

In an embodiment, the parallel chain link $CL_p$, the upper chain link $CL_u$ and the lower chain link $CL_l$ are formed by connecting unipolar and/or bipolar SMs in series.

The parallel chain link $CL_p$ is connected to the upper chain link $CL_u$ and the lower chain link $CL_l$, where the upper chain link $CL_u$ and the lower chain link $CL_l$ are connected in series. The DC link voltage $u_d$ is the input DC voltage connected to the parallel chain link $CL_p$. Further, an input current $I_d$ is generated due to the DC link voltage $u_d$, is shared to flow through the parallel chain link $CL_p$, the upper chain link $CL_u$ and the lower chain link $CL_l$ as parallel chain link current $i_p$, upper chain link current $i_u$ and lower chain link current $i_l$ respectively.

The small arm inductor $L_3$ is connected in series to the parallel chain link $CL_p$. The small arm inductor $L_1$ is connected in series to the upper chain link $CL_u$. The small arm inductor $L_2$ is connected in series to the lower chain link $CL_l$. Further, all small arm inductors $L_1$, $L_2$ and $L_3$ are connected in series to its corresponding chain links for limiting the circulating current within the chain links due to fluctuation of a capacitor voltage in the SMs. In an embodiment, the position and number of the small arm inductors $L_1$, $L_2$ and $L_3$ can be modified as per requirement and design to minimize a circulating current.

The parallel chain link $CL_p$ is used to generate an absolute value of a required amount of AC output voltage $u_s$ from the DC link voltage $u_d$ during the full cycle of the AC output voltage $u_s$. The voltage generated by the parallel chain link $CL_p$ is parallel chain link voltage $u_p$.

The upper chain link $CL_u$ is simultaneously used along with the parallel chain link $CL_p$ to generate the absolute value of the AC output voltage $u_s$ during a positive half cycle of the AC output voltage $u_s$. Further, the SMs in the upper chain link $CL_u$ is bypassed to set a reference voltage of upper chain link $CL_u$ to a zero voltage during a negative half cycle. The voltage generated by the upper chain link $CL_u$ is upper chain link voltage $u_u$.

The lower chain link $CL_l$ is simultaneously used along with the parallel chain link $CL_p$ to generate the absolute value of the AC output voltage $u_s$ during a negative half cycle of the AC output voltage $u_s$. Further, the SMs in the lower chain link $CL_l$ is bypassed to set the reference voltage of the lower chain link $CL_l$ to the zero voltage. The voltage generated by the lower chain link $CL_l$ is lower chain link voltage $u_l$.

The switches $S_1$ and $S_2$ are connected to the upper chain link $CL_u$ and the lower chain link $CL_l$, where the switches $S_1$ and $S_2$ are connected in series. The switches $S_1$ and $S_2$ are used to continue and discontinue a circuit path in the single phase HMMC 100. The switches $S_1$ and $S_2$ are formed either by using semi controlled semiconductor device like thyristors or by using fully controlled semiconductor device like IGBTs or any other suitable semiconductor device. The current flowing through the switch $S_1$ is switch current $i_{us}$, when the switch $S_1$ continues the circuit path. The current flowing through the switch $S_2$ is switch current $i_{ls}$, when the switch $S_2$ continuous the circuit path. An output of the single phase HMMC 100 is obtained from a node in a series connection of the upper chain link $CL_u$ and the lower chain link $CL_l$ and the node in the series connection of the switches $S_1$ and $S_2$.

During the generation of the positive half cycle of the AC output voltage $u_s$ at the output of the single phase HMMC 100, the switch $S_1$ continues the circuit path and the switch $S_2$ discontinues the circuit path. Further, the reference voltage of lower chain link $CL_l$ sets to the zero voltage by bypassing all the SMs in the lower chain link $CL_l$. Therefore, the parallel chain link $CL_p$ and upper chain link $CL_u$ are get connected in parallel and shares the input current $I_d$. The parallel chain link $CL_p$ and the upper chain link $CL_u$ are simultaneously used to generate the absolute value of the AC output voltage $u_s$ at the output of the single phase HMMC 100, during the generation of the positive half cycle of the AC output voltage $u_s$.

During the generation of the negative half cycle of the AC output voltage $u_s$ at the output of the single phase HMMC 100, the switch $S_1$ discontinues the circuit path and the switch $S_2$ continues the circuit path for reversing a generated absolute voltage of the AC output voltage $u_s$ at the output of the single phase HMMC 100. Further, the reference voltage of upper chain link $CL_u$ sets to the zero voltage by bypassing all the SMs in the upper chain link $CL_u$. Therefore, the parallel chain link $CL_p$ and lower chain link $CL_l$ are get connected in parallel and shares the input current $I_d$. The parallel chain link $CL_p$ and the lower chain link $CL_l$ are simultaneously used to generate the absolute value of the AC output voltage $u_s$ with a reverse polarity at the output of the single phase HMMC 100, during the generation of negative half cycle of the AC output voltage $u_s$.

FIG. 2 illustrates a circuit diagram of a single phase HMMC 200, according to an embodiment as disclosed herein. In an embodiment, the single phase HMMC 200 includes the DC link voltage $u_d$, a chain link 1 $CL_1$, a chain link 2 $CL_2$ and a chain link 3 $CL_3$, the three small arm inductors $L_1$, $L_2$ and $L_3$ and the two switches $S_1$ and $S_2$.

In an embodiment, the chain link 1 $CL_1$, the chain link 2 $CL_2$ and the chain link 3 $CL_3$ are formed by connecting the unipolar and/or bipolar SMs in series.

The DC link voltage $u_d$ is the input DC voltage which is connected in parallel to the chain link 1 $CL_1$, the chain link 2 $CL_2$ and the chain link 3 $CL_3$. Further, the input current $I_d$ is generated due to the DC link voltage $u_d$, is shared to flow through the chain link 1 $CL_1$, the chain link 2 $CL_2$ and the chain link 3 $CL_3$ as chain link 1 current $i_l$, chain link 2 current $i_2$ and chain link 3 current $i_3$ respectively.

The small arm inductor $L_1$ is connected in series to the chain link 1 $CL_1$. The small arm inductor $L_2$ is connected in series to the chain link 2 $CL_2$. The small arm inductor $L_3$ is connected in series to the chain link 3 $CL_3$. Further, all the small arm inductors $L_1$, $L_2$ and $L_3$ are connected in series to its corresponding chain links for limiting the circulating current within the chain links due to fluctuation of the capacitor voltage in the SMs. In an embodiment, the position and number of the small arm inductors $L_1$, $L_2$ and $L_3$ can be modified as per requirement and design to minimize the circulating current.

The chain link 1 $CL_1$ is used to generate the absolute value of required amount of AC output voltage $u_s$ from the DC link voltage $u_d$ during the full cycle of the AC output voltage $u_s$. The voltage generated by the chain link 1 $CL_1$ is chain link 1 voltage $u_l$.

The chain link 2 $CL_2$ is simultaneously used along with the chain link 1 $CL_1$ to generate the absolute value of AC output voltage $u_s$ during the positive half cycle of the AC output voltage $u_s$. Further, the SMs in the chain link 2 $CL_2$ is bypassed to set the reference voltage of the chain link 2 $CL_2$ to the zero voltage. The voltage generated by the chain link 2 $CL_2$ is chain link 2 voltage $u_2$.

The chain link 3 $CL_3$ is simultaneously used along with the chain link 1 $CL_1$ to generate the absolute value of the AC output voltage $u_s$ during the negative half cycle of the AC output voltage $u_s$. Further, the SMs in the chain link 3 $CL_3$ is bypassed to set the reference voltage of the chain link 3 $CL_3$ to the zero voltage. The voltage generated by the chain link 3 $CL_3$ is chain link 3 voltage $u_3$.

In an embodiment, the chain link 1 $CL_1$, the chain link 2 $CL_2$ and the chain link 3 $CL_3$ are formed by connecting the unipolar and/or bipolar SMs in series.

The switch $S_1$ is connected in series to a negative terminal of the DC link voltage $u_d$ and the chain link 2 $CL_2$. The switch $S_2$ is connected in series to the negative terminal of the DC link voltage $u_d$ and the chain link 3 $CL_3$. The output of the single phase HMMC 200 is obtained from the node in the series connection of the chain link 2 $CL_2$ and the switch $S_1$ and the node in the series connection of the chain link 3 $CL_3$ and the switch $S_2$.

During the generation of the positive half cycle of the AC output voltage $u_s$ at the output of the single phase HMMC 200, the switch $S_1$ continues the circuit path and the switch $S_2$ discontinues the circuit path. Further, the reference voltage of chain link 3 $CL_3$ sets to the zero voltage by bypassing all the SMs in the chain link 3 $CL_3$. Therefore, the chain link 1 $CL_1$ and the chain link 2 $CL_2$ are get connected in parallel and shares the input current $I_d$. The chain link 1 $CL_1$ and the chain link 2 $CL_2$ are simultaneously used to generate the absolute value of the AC output voltage $u_s$ at the output of the single phase HMMC 200 during the generation of positive half cycle of the AC output voltage $u_s$.

During the generation of the negative half cycle of the AC output voltage $u_s$ at the output of the single phase HMMC 200, the switch $S_1$ discontinues the circuit path and the switch $S_2$ continues the circuit path for reversing the generated absolute voltage of the AC output voltage $u_s$ at the output of the single phase HMMC 200. Further, the reference voltage of the chain link 2 $CL_2$ sets to the zero voltage by bypassing all the SMs in the chain link 2 $CL_2$. Therefore, the chain link 1 $CL_1$ and the chain link 3 $CL_3$ are get connected in parallel and shares the input current $I_d$. The chain link 1 $CL_1$ and the chain link 3 $CL_3$ are simultaneously used to generate the absolute value of the AC output voltage $u_s$ with the reverse polarity at the output of the single phase HMMC 200 during the generation of the negative half cycle of the AC output voltage $u_s$.

FIG. 3 illustrates a circuit diagram of a single phase HMMC 300, according to an embodiment as disclosed herein. In an embodiment, the single phase HMMC 300 includes the DC link voltage $u_d$, the chain link 1 $CL_1$, the chain link 2 $CL_2$ and the chain link 3 $CL_3$, the three small arm inductors $L_1$, $L_2$ and $L_3$ and the two switches $S_1$ and $S_2$.

In an embodiment, the chain link 1 $CL_1$, the chain link 2 $CL_2$ and the chain link 3 $CL_3$ are formed by connecting the unipolar and/or bipolar SMs in series.

The chain link 1 $CL_1$ is connected parallel to the chain link 2 $CL_2$ and the chain link 3 $CL_3$. The DC link voltage $u_d$ is the input DC voltage connected to the chain link 1 $CL_1$. Further, the input current $I_d$ is generated due to the DC link voltage $u_d$, is shared to flow through the chain link 1 $CL_1$, the chain link 2 $CL_2$ and the chain link 3 $CL_3$ as the chain link 1 current $i_l$, the chain link 2 current $i_2$ and the chain link 3 current $i_3$ respectively.

The small arm inductor $L_1$ is connected in series to the chain link 1 $CL_1$. The small arm inductor $L_2$ is connected in series to the chain link 2 $CL_2$. The small arm inductor $L_3$ is connected in series to the chain link 3 $CL_3$. Further, an upper terminal of all the small arm inductors $L_1$, $L_2$ and $L_3$ are connected in series to its corresponding chain links for limiting the circulating current within the chain links due to fluctuation of the capacitor voltage in the SMs. In an embodiment, the position and number of the small arm inductors $L_1$, $L_2$ and $L_3$ can be modified as per requirement and design to minimize the circulating current.

The chain link 1 $CL_1$ is used to generate the absolute value of required amount of AC output voltage $u_s$ from the DC link voltage $u_d$ during the full cycle of the AC output voltage $u_s$. The voltage generated by the chain link 1 $CL_1$ is the chain link 1 voltage $u_l$.

The chain link 2 $CL_2$ is simultaneously used along with the chain link 1 $CL_1$ to generate the absolute value of the AC output voltage $u_s$ during the negative half cycle of the AC output voltage $u_s$. Further, the SMs in the chain link 2 $CL_2$ is bypassed to set the reference voltage of the chain link 2 $CL_2$ to the zero voltage. The voltage generated by the chain link 2 $CL_2$ is the chain link 2 voltage $u_2$.

The chain link 3 $CL_3$ is simultaneously used along with the chain link 1 $CL_1$ to generate the absolute value of the AC output voltage $u_s$ during the positive half cycle of the AC output voltage $u_s$. Further, the SMs in the chain link 3 $CL_3$ is bypassed to set the reference voltage of the chain link 3 $CL_3$ to the zero voltage. The voltage generated by the chain link 3 $CL_3$ is the chain link 3 voltage $u_3$.

The switch $S_1$ is connected in series to a positive terminal of the DC link voltage $u_d$ and the chain link 2 $CL_2$. The switch $S_2$ is connected in series to the positive terminal of the DC link voltage $u_d$ and the chain link 3 $CL_3$. The output of the single phase HMMC 300 is obtained from the node in the series connection of the chain link 2 $CL_2$ and the switch $S_1$ and the node in the series connection of the chain link 3 $CL_3$ and the switch $S_2$.

During the generation of the positive half cycle of the AC output voltage $u_s$ at the output of the single phase HMMC 300, the switch $S_1$ discontinues the circuit path and the switch $S_2$ continues the circuit path. Further, the reference voltage of the chain link 2 $CL_2$ sets to the zero voltage by bypassing all the SMs in the chain link 2 $CL_2$. Therefore, the chain link 1 $CL_1$ and the chain link 3 $CL_3$ are get connected in parallel and shares the input current $I_d$. The chain link 1 $CL_1$ and the chain link 3 $CL_3$ are simultaneously used to generate the absolute value of the AC output voltage $u_s$ at the output of the single phase HMMC 300, during the generation of the positive half cycle of the AC output voltage $u_s$.

During the generation of the negative half cycle of the AC output voltage $u_s$ at the output of the single phase HMMC 300, the switch $S_1$ continues the circuit path and the switch $S_2$ discontinues the circuit path. Further, the reference voltage of the chain link 3 $CL_3$ sets to the zero voltage by bypassing all the SMs in the chain link 3 $CL_3$. Therefore, the chain link 1 $CL_1$ and the chain link 2 $CL_2$ are get connected in parallel and shares the input current $I_d$. The chain link 1 $CL_1$ and the chain link 2 $CL_2$ are simultaneously used to generate the absolute value of the AC output voltage $u_s$ at the output of the single phase HMMC 300, during the generation of the negative half cycle of the AC output voltage $u_s$.

Figure 4:
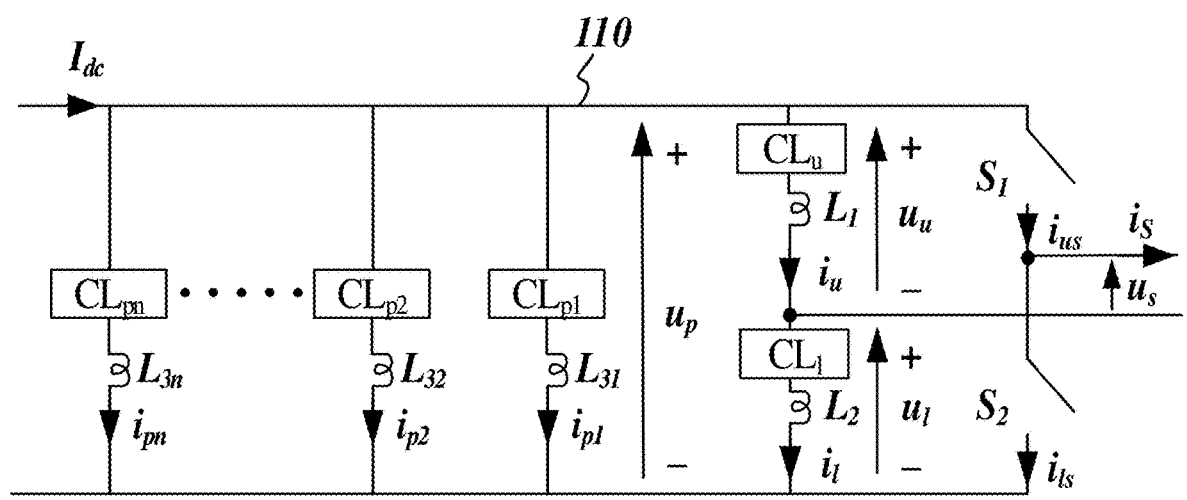
FIG. 4 illustrates a circuit diagram of a single phase HMMC, according to an embodiment as disclosed herein.

FIG. 4 illustrates a circuit diagram of a single phase HMMC 110, according to an embodiment as disclosed herein. In an embodiment, the single phase HMMC 110 contains n chain links ($CL_{p1}$-$CL_{pn}$) connected in parallel instead of one parallel chain link ($CL_p$) as in HMMC 100. In this configuration the current is divided among the n+1 parallel path. Depending on the value of current and power rating of the converter any number of chain links can be connected in parallel. The working principle of HMMC 110 can be derived from HMMC 100.

Figure 5:
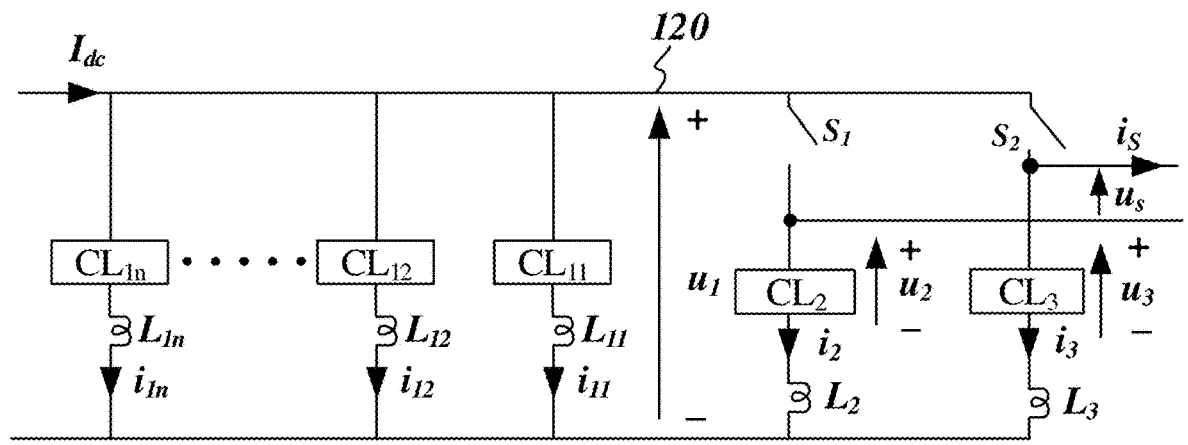
FIG. 5 illustrates a circuit diagram of the single phase HMMC, according to an embodiment as disclosed herein.

FIG. 5 illustrates a circuit diagram of a single phase HMMC 120, according to an embodiment as disclosed herein. In an embodiment, the single phase HMMC 120 contains n chain links ($CL_{11}$-$CL_{1n}$) connected in parallel instead of one parallel chain link ($CL_1$) as in HMMC 300. In this configuration the current is divided among the n+1 parallel path. Depending on the value of current and power rating of the converter any number of chain links can be connected in parallel. The working principle of HMMC 120 can be derived from HMMC 300.

Figure 6:
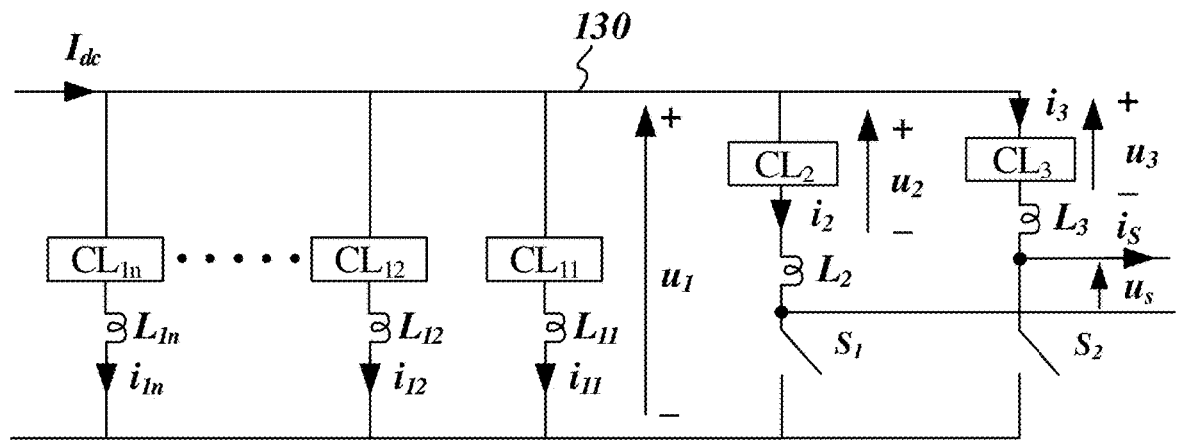
FIG. 6 illustrates a circuit diagram of the single phase HMMC, according to an embodiment as disclosed herein.

FIG. 6 illustrates a circuit diagram of a single phase HMMC 130, according to an embodiment as disclosed herein. In an embodiment, the single phase HMMC 130 contains n chain links ($CL_{11}$-$CL_{1n}$) connected in parallel instead of one parallel chain link ($CL_1$) as in HMMC 200.

In this configuration the current is divided among the n+1 parallel path. Depending on the value of current and power rating of the converter any number of chain links can be connected in parallel. The working principle of HMMC 130 can be derived from HMMC 200.

The aforementioned working principles of the circuits shown in FIG. 1 to FIG. 6 are used for illustrations purpose. However, the circuit can be operated by any other suitable control method. Moreover, the switches $S_1$ and $S_2$ shown in FIG. 1 to FIG. 6 can be formed either by using semi controlled semiconductor device like thyristors or by using fully controlled semiconductor device like IGBTs or any other suitable semiconductor device.

At least one of the circuits shown in FIG. 1 to FIG. 6 can be used as a single phase of a polyphase system. A M-phase system can be formed by connecting M such circuits in parallel, series or any other mixed combination of the both.

Figure 7:
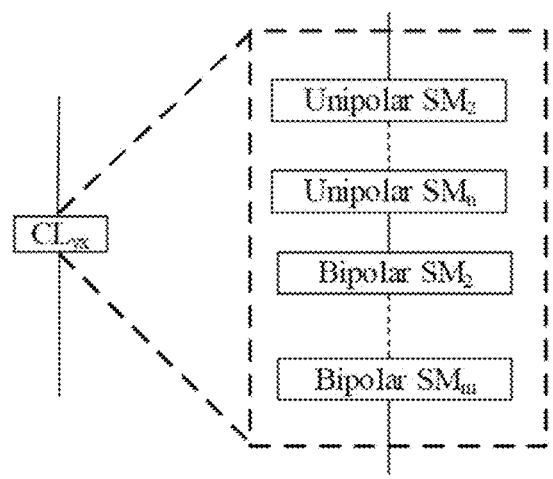
FIG. 7 illustrates a schematic diagram of a chain link constructed using unipolar and bipolar SMs, according to an embodiment as disclosed herein.

FIG. 7 illustrates a schematic diagram of the chain link constructed using unipolar and bipolar SMs, according to an embodiment as disclosed herein. The chain link is formed by connecting the unipolar and bipolar SMs in series.

Figure 8:
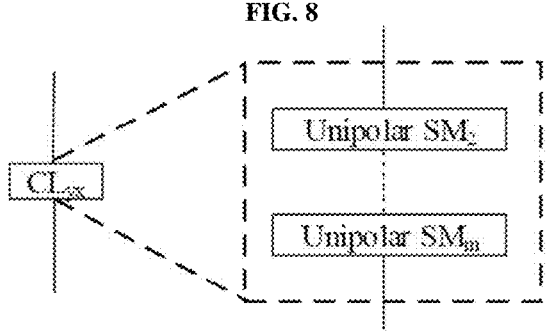
FIG. 8 illustrates a schematic diagram of the chain link constructed using the unipolar SMs, according to an embodiment as disclosed herein.

FIG. 8 illustrates a schematic diagram of the chain link constructed using unipolar SMs, according to an embodiment as disclosed herein. In an embodiment, the chain link is formed by connecting the unipolar SMs in series.

Figure 9:
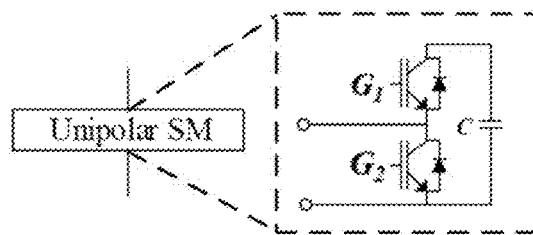
FIG. 9 illustrates a circuit diagram of a half bridge sub module, according to an embodiment as disclosed herein.

FIG. 9 illustrates a circuit diagram of a half bridge sub module, according to an embodiment as disclosed herein. A unipolar SM includes the IGBTs and a DC source or a storage element where the unipolar SM can be used to generate either a positive voltage or the zero voltage at the output terminals of unipolar SM by providing a controlled gate pulses to the IGBTs. The unipolar SM can be exemplified as the half bridge sub module (HBSM). In an embodiment, the unipolar SM includes the IGBT and the DC source or the storage element where the unipolar SM can be used to generate either the positive voltage or the zero voltage at the output terminals of unipolar SM by providing the controlled gate pulses to the IGBT. In an embodiment, a capacitor is used as the DC source or the storage element in the SMs.

Figure 10:
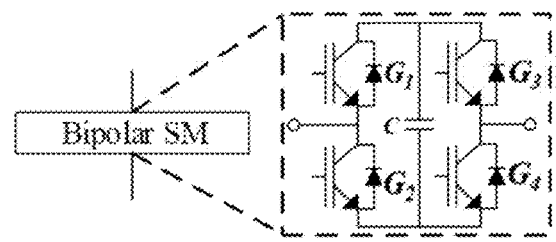
FIG. 10 illustrates a circuit diagram of a full bridge sub module, according to an embodiment as disclosed herein.

FIG. 10 illustrates a circuit diagram of a full bridge sub module, according to an embodiment as disclosed herein. The bipolar SM includes the IGBTs and at least the DC source or the storage element where the bipolar SM can be used to generate either the positive voltage or the zero voltage or a negative voltage at the output terminals of the bipolar SM by providing the controlled gate pulses to the IGBTs. The bipolar SM can be exemplified as the full bridge sub module (FBSM). In an embodiment, the bipolar SM includes the IGBTs and at least one capacitor where the bipolar SM can be used to generate either the positive voltage or the zero voltage or the negative voltage at the output terminals of the bipolar SM by providing the controlled gate pulses to the IGBTs. Further, the bipolar SM is used for commutating the semi controlled semiconductor devices like thyristors. In an embodiment, the capacitor is used as the DC source or the storage element in the SMs. The unipolar and bipolar SMs are used as illustrative example, however, any other suitable SM can be used to construct the chain links.

Figure 11:
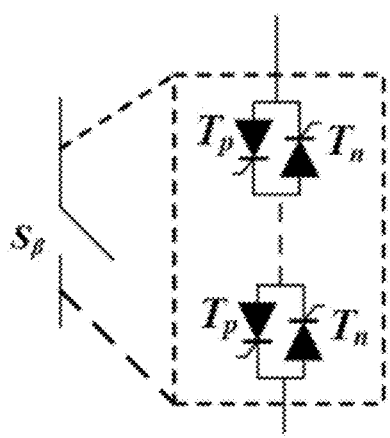
FIG. 11 illustrates a circuit diagram of a high voltage switch Sβ made of thyristors, according to an embodiment as disclosed herein.

FIG. 11 illustrates a circuit diagram of the high voltage switch $S_\beta$ (where β=1 or 2) made of the thyristors, according to an embodiment as disclosed herein. The switch $S_\beta$ (where β=1 or 2) is formed by connecting at least one anti-parallel thyristors in series.

Figure 12:
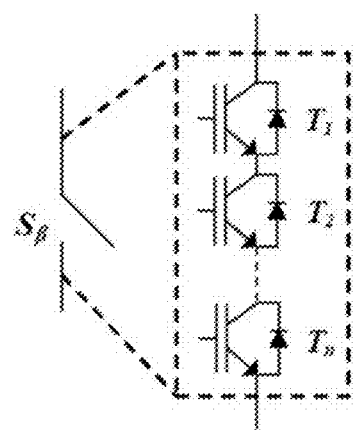
FIG. 12 illustrates a circuit diagram of a high voltage switch Sβ made of IGBTs, according to an embodiment as disclosed herein.

FIG. 12 illustrates a circuit diagram of the high voltage switch $S_\beta$ (where β=1 or 2) made of the IGBTs, according to an embodiment as disclosed herein. The switch $S_\beta$ (where $\beta=1$ or 2) is formed by connecting at least one IGBT in series. The chain links can be formed only by using the unipolar SMs, if the switches $S_1$ and $S_2$ are formed using the series connection of IGBTs.

Figure 13:
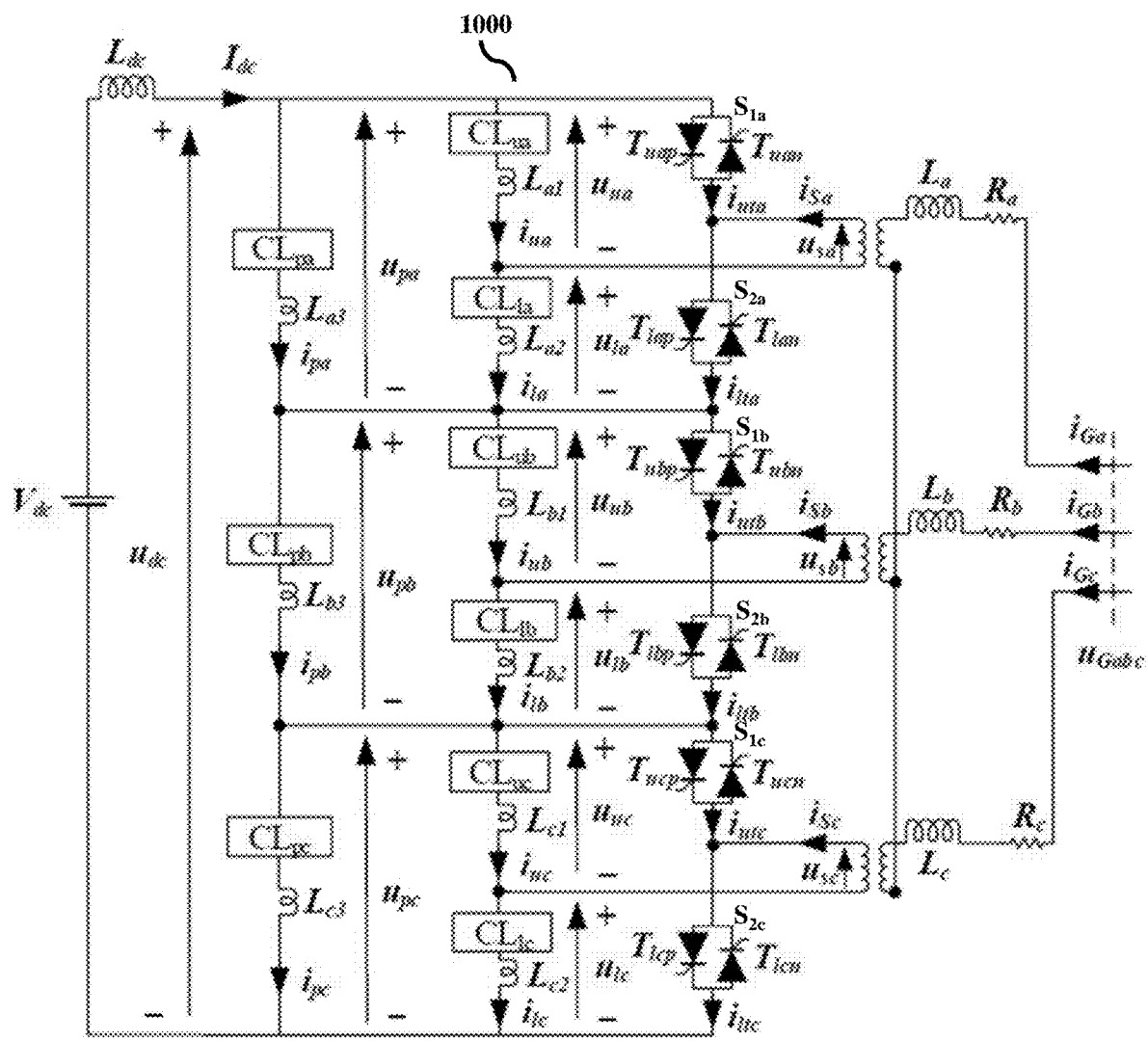
FIG. 13 illustrates a circuit diagram of a three phase HMMC, according to an embodiment as disclosed herein.

FIG. 13 illustrates a circuit diagram of a three phase HMMC 1000, according to an embodiment as disclosed herein. In an embodiment, an input DC voltage $V_{dc}$ which is further converted to an AC output voltage $u_{sx}$ (where, x=a or b or c) by the three phase HMMC 1000.

Three units of single phase HMMC 100 shown in the FIG. 1 are connected in series to form the three phase HMMC 1000, where a DC link voltage $u_{dc}$ of the three phase HMMC 1000 is formed by the summation of the DC link voltage $u_d$ of each single phase HMMC 100 unit. The input DC voltage $V_{dc}$ is connected to the three phase HMMC 1000 through a DC side inductor $L_{dc}$ to provide the DC link voltage $u_{dc}$. Further, these three units can also be connected in parallel or in any hybrid configuration to form the three phase HMMC 1000.

Each phase of the three phase HMMC 1000 contains an upper chain link $CL_{ux}$ and a lower chain link $CL_{lx}$ connected in series in one leg with a parallel leg containing a parallel chain link $CL_{px}$. In an embodiment, the parallel chain link $CL_{px}$, the upper chain link $CL_{ux}$ and the lower chain link $CL_{lx}$ are formed from a mixed combination of the any unipolar and bipolar SMs. Further, the parallel chain link $CL_{px}$, the upper chain link $CL_{ux}$ and the lower chain link $CL_{lx}$ are considered to be formed from series connection of the HBSMs and the FBSMs. The FBSMs are used to force commutate a thyristor valve near a zero crossing of a voltage before firing a complimentary thyristor valve.

Further, the input current $I_{dc}$ is generated due to the DC link voltage $u_{dc}$ is shared to flow through the parallel chain link $CL_{px}$, the upper chain link $CL_{ux}$ and the lower chain link $CL_{lx}$ as parallel chain link current $i_{px}$, upper chain link current $i_{ux}$ and lower chain link current $i_{lx}$ respectively.

A small arm inductor $L_{x3}$ is connected in series to the parallel chain link $CL_{px}$. A small arm inductor $L_{x1}$ is connected in series to the upper chain link $CL_{ux}$. A small arm inductor $L_{x2}$ is connected in series to the lower chain link $CL_{lx}$. Further, all the small arm inductors $L_{x1}$, $L_{x2}$ and $L_{x3}$ are connected in series to its corresponding chain links for limiting the circulating current within the chain links due to fluctuation of the capacitor voltage in the SMs. In an embodiment, the position and number of the small arm inductors $L_{x1}$, $L_{x2}$ and $L_{x3}$ can be modified as per requirement and design to minimize the circulating current.

The parallel chain link $CL_{px}$ is used to generate the absolute value of required amount of the AC output voltage $u_{sx}$ from the DC link voltage $u_{dc}$ during the full cycle of the AC output voltage $u_{sx}$. The voltage generated by the parallel chain link $CL_{px}$ is parallel chain link voltage $u_{px}$.

The upper chain link $CL_{ux}$ is simultaneously used along with the parallel chain link $CL_{px}$ to generate the absolute value of the AC output voltage $u_{sx}$ during the positive half cycle of the AC output voltage $u_{sx}$. Further, the SMs in the upper chain link $CL_{ux}$ is bypassed to set the reference voltage of the upper chain link $CL_{ux}$ to the zero voltage. The voltage generated by the upper chain link $CL_{ux}$ is upper chain link voltage $u_{ux}$.

The lower chain link $CL_{lx}$ is simultaneously used along with the parallel chain link $CL_{px}$ to generate the absolute value of the AC output voltage $u_{sx}$ during the negative half cycle of the AC output voltage $u_{sx}$. Further, the SMs in the lower chain link $CL_{lx}$ is bypassed to set the reference voltage of the lower chain link $CL_{lx}$ to the zero voltage. The voltage generated by the lower chain link $CL_{lx}$ is lower chain link voltage $u_{lx}$.

High voltage switches $S_{1x}$ and $S_{2x}$ are connected to the upper chain link $CL_{ux}$ and the lower chain link $CL_{lx}$, where the switches $S_{1x}$ and $S_{2x}$ are connected in series. The switches $S_{1x}$ and $S_{2x}$ are used to continue and discontinue the circuit path in the three phase HMMC 1000. The current flowing through the switch S1x is switch current $i_{utx}$, when the switch $S_1$ continues the circuit path. The current flowing through the switch $S_2$, is the switch current $i_{ltx}$, when the switch $S_2$ continuous the circuit path. The output of the three phase HMMC 1000 is obtained from the node in the series connection of the upper chain link $CL_{ux}$ and the lower chain link $CL_{lx}$ and the node in the series connection of the switches $S_{1x}$ and $S_{2x}$.

The switches $S_{1x}$ and $S_{2x}$ of the three phase HMMC 1000 are formed by using a thyristor valve where a plurality of anti-parallel thyristors connected in series to form the thyristor valve as shown in FIG. 11. The switch $S_{1x}$ is formed of the thyristor valve called as upper thyristor valve $T_{uxz}$ (where, z=p or n). The switch $S_{2x}$ is formed of the thyristor valve called as lower thyristor valve $T_{lxz}$.

Further, the switches $S_{1x}$ and $S_{2x}$ can be formed by using fully controlled semiconductor device like IGBTs or any other suitable semiconductor device. If $S_{1x}$ and $S_{2x}$ are formed by using fully controlled semiconductor device in series than the chain links can be formed using the unipolar SMs only.

During the generation of the positive half cycle of the AC output voltage $u_{sx}$ at the output of the three phase HMMC 1000, the upper antiparallel thyristor valve $T_{uxz}$ is triggered (i.e., the switch $S_{1x}$ continues the circuit path and the switch $S_{2x}$ discontinues the circuit path). Further, the reference voltage of the lower chain link $CL_{lx}$ sets to the zero voltage by bypassing all the SMs in the lower chain link $CL_{lx}$. Therefore, the parallel chain link $CL_{px}$ and the upper chain link $CL_{ux}$ are get connected in parallel with the load, shares the input current $I_{dc}$ and feeds a load/grid simultaneously. The parallel chain link $CL_{px}$ and the upper chain link $CL_{ux}$ are simultaneously used to generate the absolute value of the AC output voltage $u_{sx}$ at the output of the three phase HMMC 1000 during the generation of the positive half cycle of the AC output voltage $u_{sx}$.

During the generation of the negative half cycle of the AC output voltage $u_{sx}$ at the output of the three phase HMMC 1000, the lower antiparallel thyristor valve $T_{lxz}$ is triggered (i.e., the switch $S_{1x}$ discontinues the circuit path and the switch $S_{2x}$ continues the circuit path) for reversing the generated absolute voltage of the AC output voltage $u_{sx}$ at the output of the three phase HMMC 1000. Further, the reference voltage of upper chain link $CL_{ux}$ sets to the zero voltage by bypassing all the SMs in the upper chain link $CL_{ux}$. Therefore, the parallel chain link $CL_{px}$ and the lower chain link $CL_{lx}$ are get connected in parallel, shares the input current $I_{dc}$ and feeds the load/grid simultaneously. The parallel chain link $CL_{px}$ and the lower chain link $CL_{lx}$ are simultaneously used to generate the absolute value of the AC output voltage $u_{sx}$ with the reverse polarity at the output of the three phase HMMC 1000, during the generation of the negative half cycle of the AC output voltage $u_{sx}$.

The three phase AC output voltage $u_{sx}$ is fed to a secondary winding of a transformer. Hence the secondary winding of the transformer is the load for the three phase HMMC 1000. Further, an AC output voltage $u_{Gabc}$ is obtained at a primary or grid side winding of the transformer through a series connected grid inductor $L_x$ and resistor $R_x$. The current flows at the output of the transformer is $i_{Gx}$.

The primary side of the transformers in HMMC 1000 are exemplified as star connected. However, the primary or grid side of the converter can be connected in star or delta or any other configuration depending on the application.

The three phase HMMC 1000 have a better fault handling capability due to presence of the thyristors. The thyristors have a higher surge current handling capability. Hence, the thyristors can be used to carry a higher fault current till an AC circuit breaker operates. For example, whenever a DC side fault occurs in the three phase HMMC 1000, all the thyristor valve should be fired. Besides blocking the firing pulses of all the SMs in the chain links ($CL_{px}$, $CL_{ux}$ and $CL_{lx}$). By doing so a DC fault current gets confined to the leg containing the thyristor valve, till the AC circuit breaker operates. Hence, the IGBTs in the SMs are safeguarded from a high fault current. Due to the presence of a DC side inductor $L_{dc}$, the high fault current is below the surge current handling capability of the thyristor. The aforementioned method is stated as an example illustrative method for controlling the three phase HMMC 1000 during the DC side fault. However, any other suitable control method can be used to effectively limit the DC side fault current and to make the three phase HMMC 1000 become fault resistant.

Figure 14:
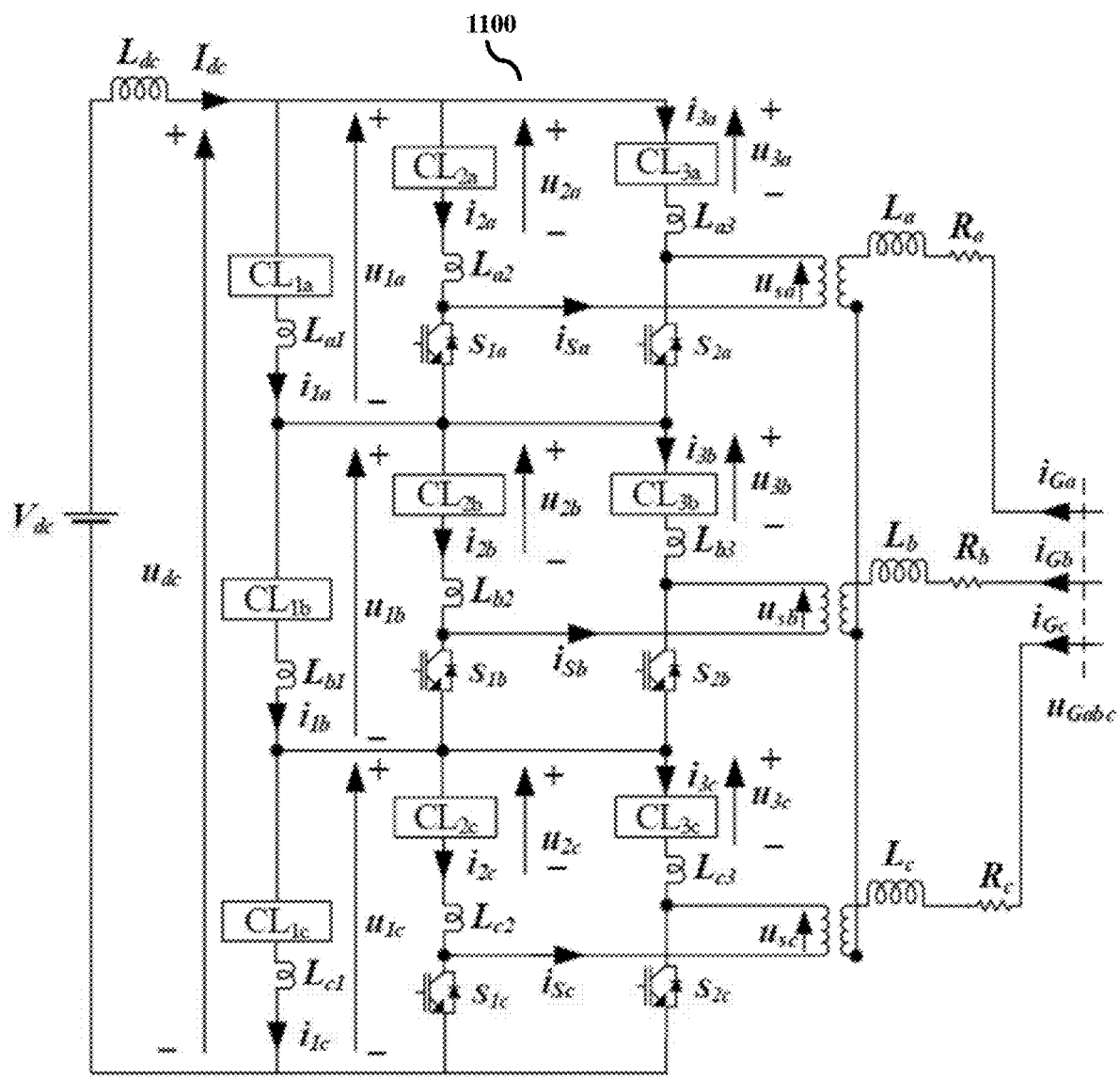
FIG. 14 illustrates a circuit diagram of the three phase HMMC, according to an embodiment as disclosed herein.

FIG. 14 illustrates a circuit diagram of a three phase HMMC 1100, according to an embodiment as disclosed herein. In an embodiment, the input DC voltage $V_{dc}$ which is further converted to the AC output voltage $u_{sx}$ (where, x=a or b or c) by the three phase HMMC 1100.

Three units of single phase HMMC 200 shown in the FIG. 2 are connected in series to form the three phase HMMC 1100, where the DC link voltage $u_{dc}$ of the three phase HMMC 1100 is formed by the summation of the DC link voltage $u_d$ of each single phase HMMC 200 unit. The input DC voltage $V_{dc}$ is connected to the three phase HMMC 1100 through the DC side inductor $L_{dc}$ to provide the DC link voltage $u_{dc}$. Further, these three units can also be connected in the parallel or in any hybrid configuration to form the three phase HMMC 1100.

Each phase of HMMC 1100 has three chain links and two chain links are always connected in parallel across the load. Each phase of the three phase HMMC 1100 contains the leg with a chain link 2 $CL_{2x}$, the leg with a chain link 3 $CL_{3x}$ connected in parallel with the leg containing a chain link 1 $CL_{1x}$. In an embodiment, the chain link 1 $CL_{1x}$, the chain link 2 $CL_{2x}$ and the chain link 3 $CL_{3x}$ are formed from the unipolar SMs.

Further, an input current $I_{dc}$ is generated due to the DC link voltage $u_{dc}$, is shared to flow through the chain link 1 $CL_{1x}$, the chain link 2 $CL_{2x}$ and the chain link 3 $CL_{3x}$ as chain link 1 current $i_{1x}$, chain link 2 current $i_{2x}$ and chain link 3 current $i_{3x}$ respectively.

The small arm inductor $Lx_1$ is connected in series to the chain link 1 $CL_{1x}$. The small arm inductor $Lx_2$ is connected in series to the chain link 2 $CL_{2x}$. The small arm inductor $Lx_3$ is connected in series to the chain link 3 $CL_{3x}$. Further, all the small arm inductors $Lx_1$, $Lx_2$ and $Lx_3$ are connected in series to its corresponding chain links for limiting the circulating current within the chain links due to fluctuation of the capacitor voltage in the SMs. In an embodiment, the position and number of the small arm inductors $Lx_1$, $Lx_2$ and $Lx_3$ can be modified as per requirement and design to minimize the circulating current.

The chain link 1 $CL_{1x}$ is used to generate the absolute value of required amount of AC output voltage $u_{sx}$ from the DC link voltage $u_{dc}$ during the full cycle of the AC output voltage $u_{sx}$. The voltage generated by the chain link 1 $CL_{1x}$ is chain link 1 voltage $u_{1x}$.

The chain link 2 $CL_{2x}$ is simultaneously used along with the chain link 1 $CL_{1x}$ to generate the absolute value of AC output voltage $u_{sx}$ during the positive half cycle of the AC output voltage $u_{sx}$. Further, the SMs in the chain link 2 $CL_{2x}$ is bypassed to set a reference voltage of chain link 2 $CL_{2x}$ to the zero voltage. The voltage generated by the chain link 2 $CL_{2x}$ is chain link 2 voltage $u_{2x}$.

The chain link 3 $CL_{3x}$ is simultaneously used along with the chain link 1 $CL_{1x}$ to generate the absolute value of the AC output voltage $u_{sx}$ during the negative half cycle of the AC output voltage $u_{sx}$. Further, the SMs in the chain link 3 $CL_{3x}$ is bypassed to set the reference voltage of the chain link 3 $CL_{3x}$ to the zero voltage. The voltage generated by the chain link 3 $CL_{3x}$ is chain link 3 voltage $u_{3x}$.

The switches $S_{1x}$ and $S_{2x}$ of the three phase HMMC 1100 are formed by using the fully controlled semiconductor device like IGBTs. $S_{1x}$ and $S_{2x}$ can also be formed by using semi-controlled devices like thyristors. If $S_{1x}$ and $S_{2x}$ are formed by using semi-controlled devices than at least one bipolar SMs must be used in the chain links to facilitate commutation of the semi-controlled devices.

The switch $S_{1x}$ is connected in series to the negative terminal of the corresponding DC link voltage (not shown) of each phase and the chain link 2 $CL_{2x}$. The switch $S_{2x}$ is connected in series to the negative terminal of the corresponding DC link voltage (not shown) of each phase and the chain link 3 $CL_{3x}$. The output of the three phase HMMC 1100 is obtained from the node in the series connection of the chain link 2 $CL_{2x}$ and the switch $S_{1x}$ and the node in series connection of the chain link 3 $CL_{3x}$ and the switch $S_{2x}$.

During the generation of the positive half cycle of the AC output voltage $u_{sx}$ at the output of the three phase HMMC 1100, the switch $S_{1x}$ continues the circuit path and the switch $S_{2x}$ discontinues the circuit path. Further, the reference voltage of the chain link 3 $CL_{3x}$ sets to the zero voltage by bypassing all the SMs in the chain link 3 $CL_{3x}$. Therefore, the chain link 1 $CL_{1x}$ and the chain link 2 $CL_{2x}$ are get connected in parallel, shares the input current $I_{dc}$ and feeds the load/grid simultaneously. The chain link 1 $CL_{1x}$ and the chain link 2 $CL_{2x}$ are simultaneously used to generate the absolute value of the AC output voltage $u_{sx}$ at the output of the three phase HMMC 1100, during the generation of the positive half cycle of the AC output voltage $u_{sx}$.

During the generation of the negative half cycle of the AC output voltage $u_{sx}$ at the output of the three phase HMMC 1100, the switch $S_{1x}$ discontinues the circuit path and the switch $S_{2x}$ continues the circuit path for reversing the generated absolute voltage of the AC output voltage $u_{sx}$ at the output of the three phase HMMC 1100. Further, the reference voltage of chain link 2 $CL_{2x}$ sets to the zero voltage by bypassing all the SMs in the chain link 2 $CL_{2x}$. Therefore, the chain link 1 $CL_{1x}$ and the chain link 3 $CL_{3x}$ are get connected in parallel, shares the input current $I_d$ and feeds the load/grid simultaneously. The chain link 1 $CL_{1x}$ and the chain link 3 $CL_{3x}$ are simultaneously used to generate the absolute value of the AC output voltage $u_{sx}$ with the reverse polarity at the output of the three phase HMMC 1100, during the generation of the negative half cycle of the AC output voltage $u_{sx}$.

The three phase AC output voltage $u_{sx}$ is fed to the secondary winding of the transformer. Hence the secondary winding of the transformer is the load for the three phase HMMC 1100. Further, the AC output voltage $u_{Gabc}$ is obtained at the primary winding of the transformer through the series connected grid inductor $L_x$ and resistor $R_x$. The current flows at the output of the transformer is $i_{Gx}$.

Figure 15:
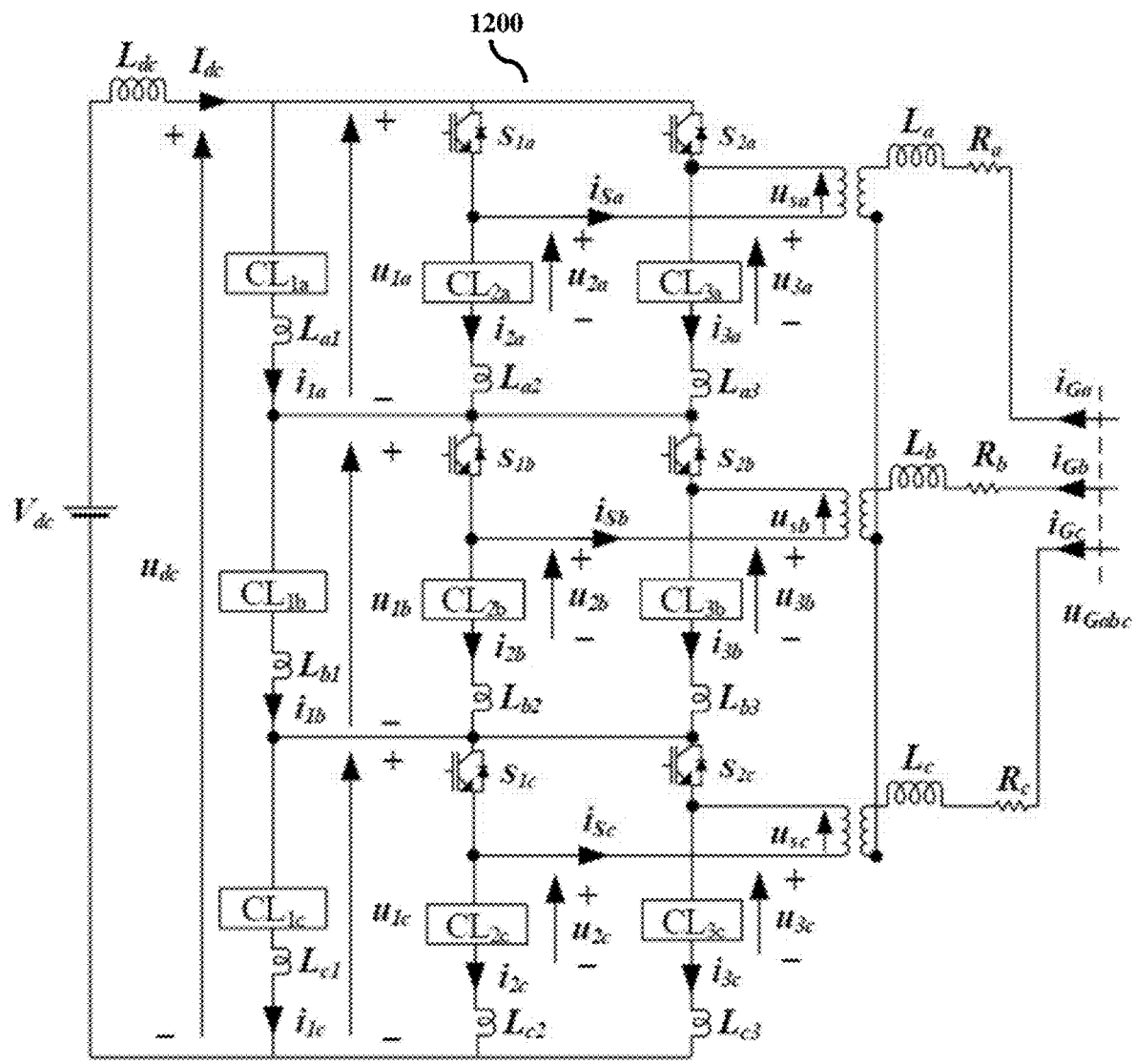
FIG. 15 illustrates a circuit diagram of the three phase HMMC, according to an embodiment as disclosed herein.

FIG. 15 illustrates a circuit diagram of a three phase HMMC 1200, according to an embodiment as disclosed herein. In an embodiment, the input DC voltage $V_{dc}$ which is further converted to the AC output voltage $u_{sx}$ (where, x=a or b or c) by the three phase HMMC 1200.

Three units of single phase HMMC 300 shown in the FIG. 3 are connected in series to form the three phase HMMC 1200, where the DC link voltage $u_{dc}$ of the three phase HMMC 1200 is formed by the summation of the DC link voltage $u_d$ of each single phase HMMC 300 unit. The input DC voltage $V_{dc}$ is connected to the three phase HMMC 1200 through the dc side inductor $L_{dc}$ to provide the DC link voltage $u_{dc}$. Further, these three units can also be connected in the parallel or in any hybrid configuration to form the three phase HMMC 1200.

The three phase HMMC 1200 has three chain links and two chain links are always connected in parallel across the load. Each phase of the three phase HMMC 1200 contains the leg with the chain link 2 $CL_{2x}$, the leg with the chain link 3 $CL_{3x}$ connected in parallel with the leg containing the chain link 1 $CL_{1x}$. In an embodiment, the chain link 1 $CL_{1x}$, the chain link 2 $CL_{2x}$ and the chain link 3 $CL_{3x}$ are formed from the unipolar SMs.

Further, the input current $I_{dc}$ is generated due to the DC link voltage $u_{dc}$, is shared to flow through the chain link 1 $CL_{1x}$, the chain link 2 $CL_{2x}$ and the chain link 3 $CL_{3x}$ as the chain link 1 current $i_{1x}$, the chain link 2 current $i_{2x}$ and the chain link 3 current $i_{3x}$ respectively.

The small arm inductor $Lx_1$ is connected in series to the chain link 1 $CL_{1x}$. The small arm inductor $Lx_2$ is connected in series to the chain link 2 $CL_{2x}$. The small arm inductor $Lx_3$ is connected in series to the chain link 3 $CL_{3x}$. Further, all the small arm inductors $Lx_1$, $Lx_2$ and $Lx_3$ are connected in series to its corresponding chain links for limiting the circulating current within the chain links due to fluctuation of the capacitor voltage in the SMs. In an embodiment, the position and number of the small arm inductors $Lx_1$, $Lx_2$ and $Lx_3$ can be modified as per requirement and design to minimize the circulating current.

The chain link 1 $CL_{1x}$ is used to generate the absolute value of the required amount of the AC output voltage $u_{sx}$ from the DC link voltage $u_{dc}$ during the full cycle of the AC output voltage $u_{sx}$. The voltage generated by the chain link 1 $CL_{1x}$ is the chain link 1 voltage $u_{1x}$.

The chain link 2 $CL_{2x}$ is simultaneously used along with the chain link 1 $CL_{1x}$ to generate the absolute value of the AC output voltage $u_{sx}$ during the negative half cycle of the AC output voltage $u_{sx}$. Further, the SMs in the chain link 2 $CL_{2x}$ is bypassed to set the reference voltage of the chain link 2 $CL_{2x}$ to the zero voltage. The voltage generated by the chain link 2 $CL_{2x}$ is the chain link 2 voltage $u_{2x}$.

The chain link 3 $CL_{3x}$ is simultaneously used along with the chain link 1 $CL_{1x}$ to generate the absolute value of the AC output voltage $u_{sx}$ during the positive half cycle of the AC output voltage $u_{sx}$. Further, the SMs in the chain link 3 $CL_{3x}$ is bypassed to set the reference voltage of the chain link 3 $CL_{3x}$ to the zero voltage. The voltage generated by the chain link 3 $CL_{3x}$ is the chain link 3 voltage $u_{3x}$.

The switches $S_{1x}$ and $S_{2x}$ of the three phase HMMC 1200 are formed by using the fully controlled semiconductor device like the IGBTs. $S_{1x}$ and $S_{2x}$ can also be formed by using semi-controlled devices like thyristors. If $S_{1x}$ and $S_{2x}$ are formed by using semi-controlled devices than at least one bipolar SMs must be used in the chain links to facilitate commutation of the semi-controlled devices.

The switch $S_{1x}$ is connected in series to the positive terminal of the corresponding DC link voltage (not shown) of each phase and the chain link 2 $CL_{2x}$. The switch $S_{2x}$ is connected in series to the positive terminal of the corresponding DC link voltage (not shown) of each phase and the chain link 3 $CL_{3x}$. The output of the three phase HMMC 1200 is obtained from the node in the series connection of the chain link 2 $CL_{2x}$ and the switch $S_{1x}$ and the node in series connection of the chain link 3 $CL_{3x}$ and the switch $S_{2x}$.

During the generation of the negative half cycle of the AC output voltage $u_{sx}$ at the output of the three phase HMMC 1200, the switch $S_{1x}$ continues the circuit path and the switch $S_{2x}$ discontinues the circuit path. Further, the reference voltage of the chain link 3 $CL_{3x}$ sets to the zero voltage by bypassing all the SMs in the chain link 3 $CL_{3x}$. Therefore, the chain link 1 $CL_{1x}$ and the chain link 2 $CL_{Ix}$ are get connected in parallel, shares the input current $I_{dc}$ and feeds the load/grid simultaneously. The chain link 1 $CL_{1x}$ and the chain link 2 $CL_{2x}$ are simultaneously used to generate the absolute value of the AC output voltage $u_{sx}$ at the output of the three phase HMMC 1200, during the generation of the negative half cycle of the AC output voltage $u_{sx}$.

During the generation of the positive half cycle of the AC output voltage $u_{sx}$ at the output of the three phase HMMC 1200, the switch $S_{1x}$ discontinues the circuit path and the switch $S_{2x}$ continues the circuit path Further, the reference voltage of the chain link 2 $CL_{2x}$ sets to the zero voltage by bypassing all the SMs in the chain link 2 $CL_{2x}$. Therefore, the chain link 1 $CL_{1x}$ and chain link 3 $CL_{3x}$ are connected in parallel, shares the input current $I_d$ and feeds the load/grid simultaneously. The chain link 1 $CL_{1x}$ and the chain link 3 $CL_{3x}$ are simultaneously used to generate the absolute value of the AC output voltage $u_{sx}$ at the output of the three phase HMMC 1200 during the generation of the positive half cycle of the AC output voltage $u_{sx}$.

The three phase AC output voltage $u_{sx}$ is fed to the secondary winding of the transformer. Hence the secondary winding of the transformer is the load for the three phase HMMC 1200. Further, an AC output voltage $u_{Gabc}$ is obtained at the primary or grid side winding of the transformer through the series connected grid inductor $L_x$ and resistor $R_x$. The current flows at the output of the transformer is $i_{Gx}$.

In order to verify the working of the three phase HMMC 1000 as depicted in the FIG. 13, a simulation model of the three phase HMMC 1000 is built in a power systems computer-aided design (PSCAD). Simulation parameters used for the simulation model are summarized in Table 1. The model parameters listed in Table 1 are used for better illustration and validation. However, satisfactory results can be obtained from the HMMC 1000 designed with any other suitable set of parameters depending on the application. These parameters are just considered as an example case.

TABLE 1

| | Simulation parameters | |
|---|---|---|
| Serial number | Parameter | Value |
| 1 | DC link voltage | 200 kV |
| 2 | No. of submodules per chain link | 10 (8 HBSMs + 2 FBSMs) (8 + 2 redundant) |
| 3 | Submodule capacitance | 0.8 mF |
| 4 | Arm inductance ($L_{x1}$ and $L_{x2}$) | 1 mH |

TABLE 1-continued

Simulation parameters

| Serial number | Parameter | Value |
|---|---|---|
| 5 | Load | R = 100 Ω |
|   |   | L = 100 mH |
| 6 | Modulation index | 0.97 |

Figure 16:
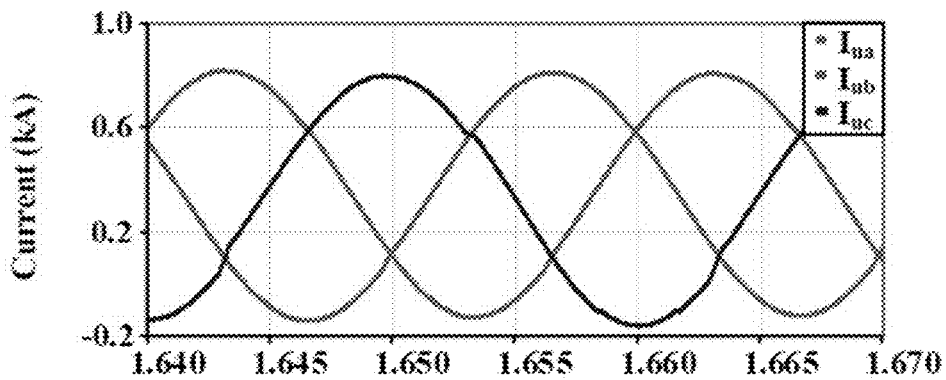
FIG. 16 is a graph showing a current flowing through a upper chain link, according to the embodiments as disclosed herein.
Figure 17:
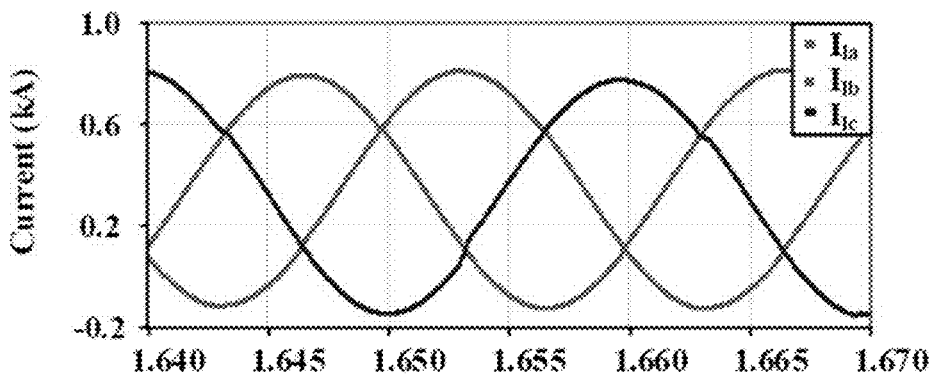
FIG. 17 is a graph showing the current flowing through a lower chain link, according to the embodiments as disclosed herein.
Figure 18:
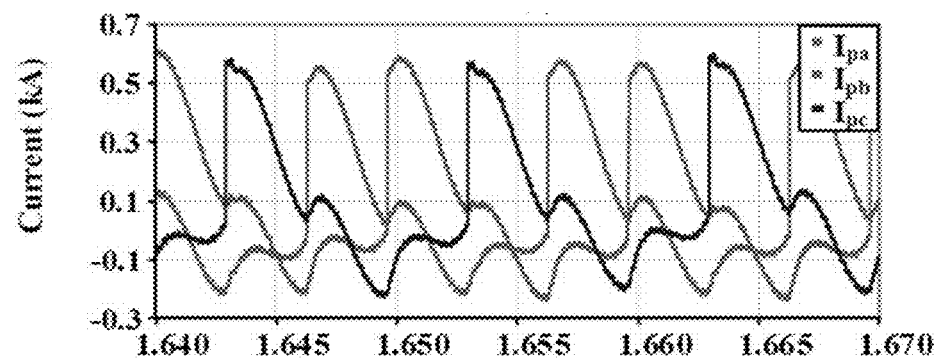
FIG. 18 is a graph showing the current flowing through a parallel chain link, according to the embodiments as disclosed herein.
Figure 19:
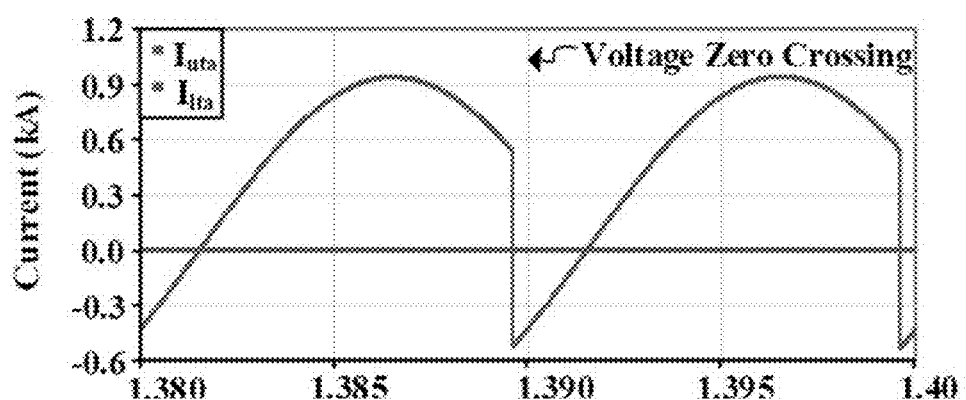
FIG. 19 is a graph showing the current flowing through thyristor valves of a phase, according to the embodiments as disclosed herein.
Figure 20:
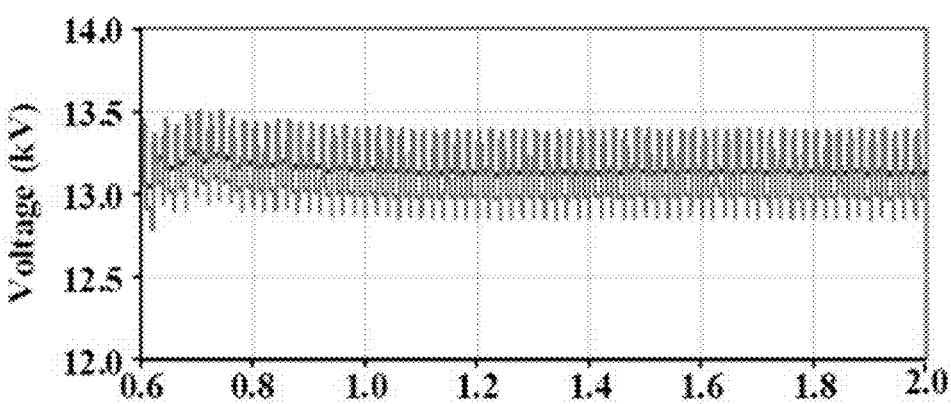
FIG. 20 is a graph showing sub module capacitor voltages, according to the embodiments as disclosed herein.
Figure 21:
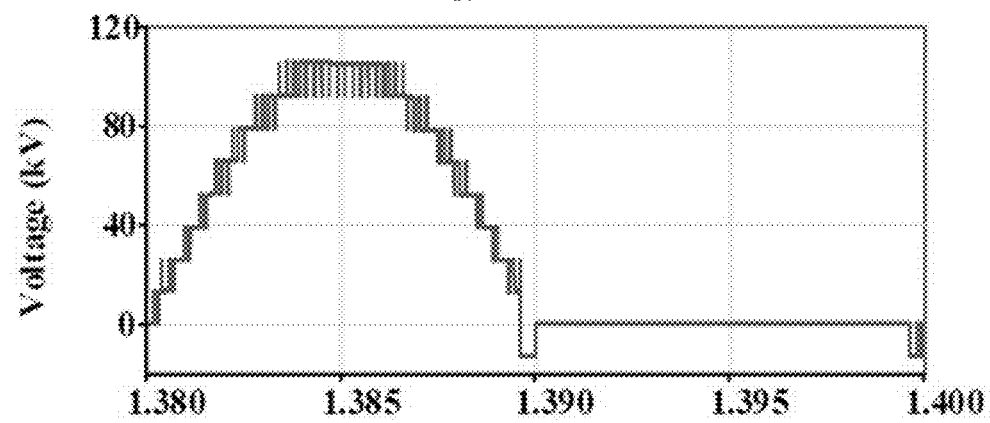
FIG. 21 is a graph showing a voltage generated by the upper chain link, according to the embodiments as disclosed herein.
Figure 22:
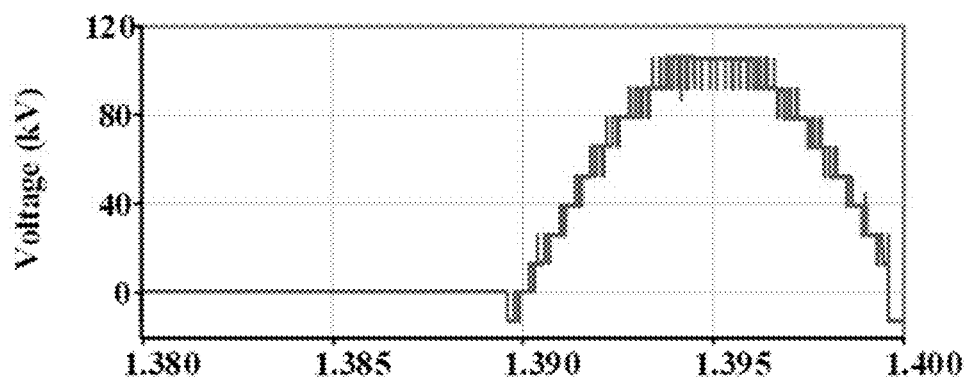
FIG. 22 is a graph showing the voltage generated by the lower chain link, according to the embodiments as disclosed herein.
Figure 23:
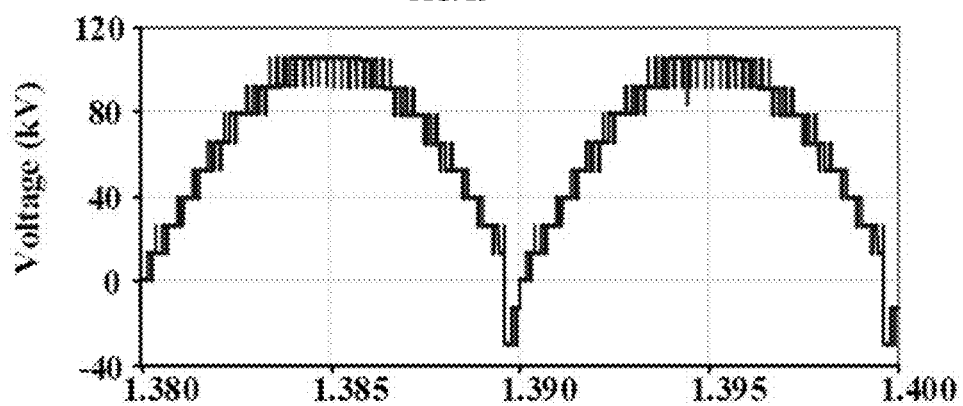
FIG. 23 is a graph showing the voltage generated by the parallel chain link, according to the embodiments as disclosed herein.
Figure 24:
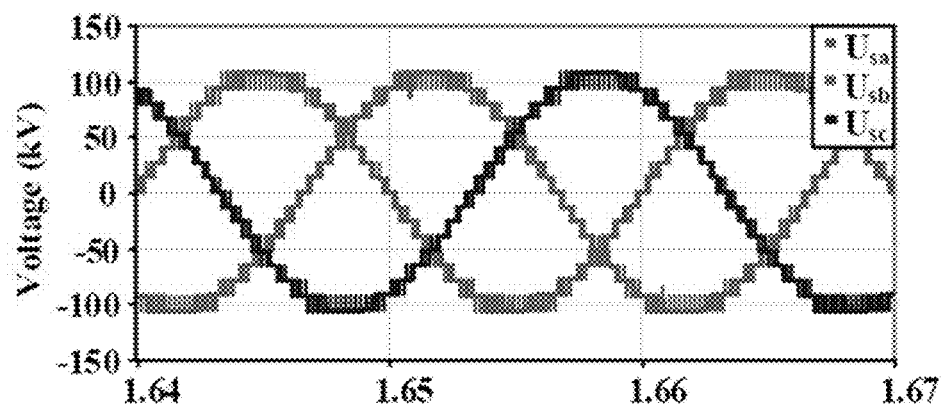
FIG. 24 is a graph showing an output voltage of a three phase HMMC, according to the embodiments as disclosed herein.
Figure 25:
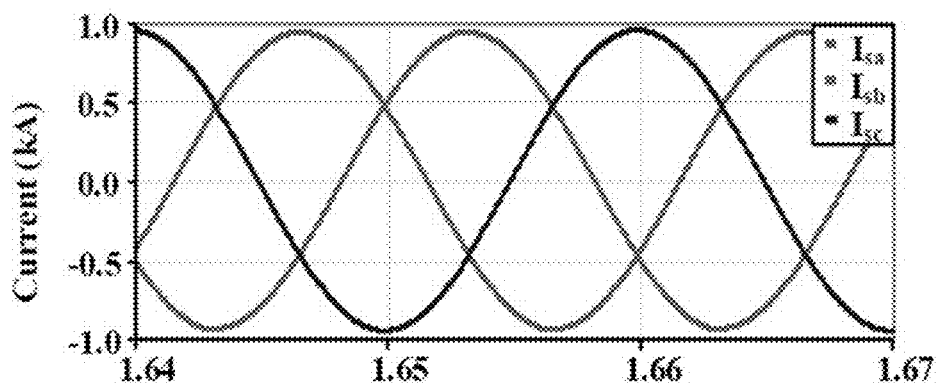
FIG. 25 is a graph showing an output current of the three phase HMMC, according to the embodiments as disclosed herein.
Figure 26:
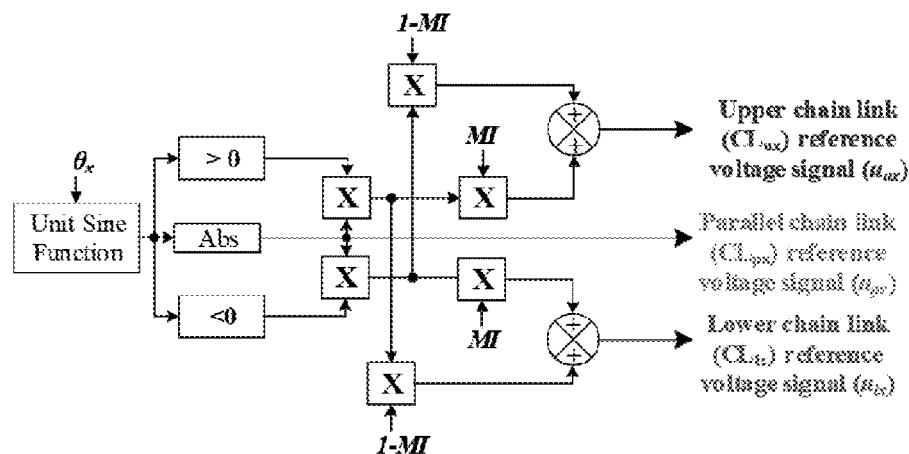
FIG. 26 illustrates the block diagram of the new control method developed to have wide modulation index range, according to the embodiments as disclosed herein.

FIG. 16 shows the current flowing through the upper chain link $CL_{ux}$ ($i_{ux}$). The current flowing through lower chain link $CL_{lx}$ ($i_{lx}$) is shown in FIG. 17. The upper chain link $CL_{ux}$ and the lower chain links $CL_{lx}$ that carries the AC current which is superimposed on the DC like that in the three phase MMC. FIG. 18 shows the current flowing through the parallel chain link $CL_{px}$ ($i_{px}$). The current flowing through thyristor valves of a phase ($i_{uta}$ and $i_{lta}$) are shown in FIG. 19. The sub module capacitor voltage of the phase is shown in FIG. 20. The voltage generated by upper chain link $CL_{ux}$, lower chain links $CL_x$ and parallel chain link $CL_{px}$ of the phase are shown in FIG. 21, FIG. 22, FIG. 23 respectively. The negative voltage is generated by the chain links just before zero crossing of the output voltage to commutate the conducting thyristor valve before firing the complimentary thyristor valve. The output voltage and current of the converter are shown in FIG. 24 and FIG. 25, respectively. The output voltage and the output current waveforms are similar to the output voltage and the output current obtained from the three phase MMC even if thyristors are used. Hence, the illustrated three phase HMMC 1000 in FIG. 13 gives higher conversion efficiency with enhanced power handling capability. The aforesaid results are obtained by using standard third harmonic injection method. However, the proposed converter HMMC 1000 can also be controlled using the following proposed control method or any other suitable control method.

A new control technique is also developed to vary the modulation index of the converter. The block diagram of the new controller is presented in FIG. 26. In the FIG. 26, $\theta_x$ is the phase delay required, MI is the modulation index and Abs is the absolute function block. This proposed control method provide a wide range of modulation index without any additional sub module requirement.

Figure 27:
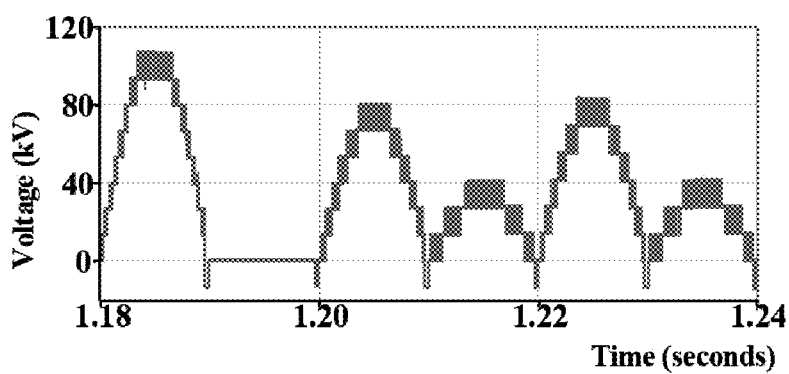
FIG. 27 is a graph showing a voltage generated by the upper chain link during modulation index change, according to the embodiments as disclosed herein.
Figure 28:
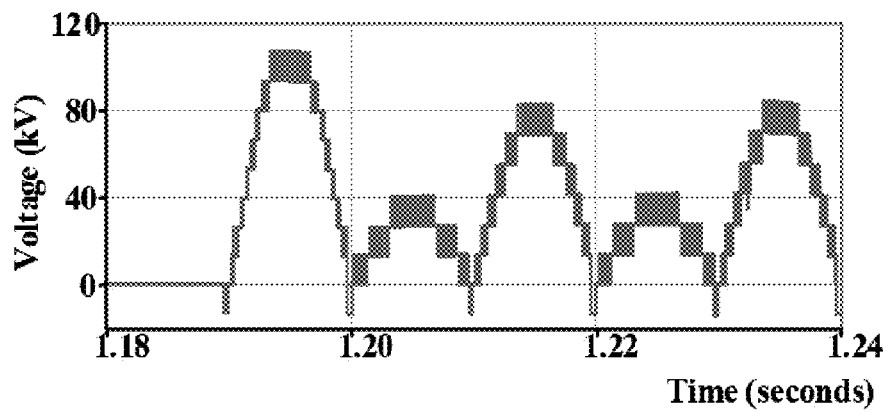
FIG. 28 is a graph showing the voltage generated by the lower chain link during modulation index change, according to the embodiments as disclosed herein.
Figure 29:
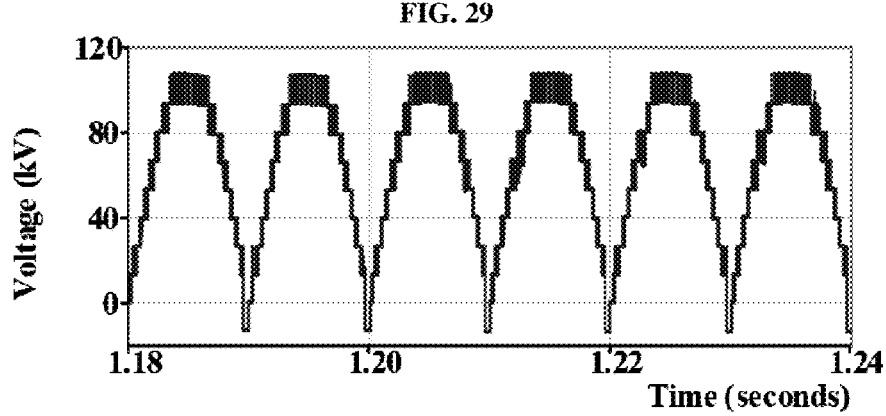
FIG. 29 is a graph showing the voltage generated by the parallel chain link during modulation index change, according to the embodiments as disclosed herein.
Figure 30:
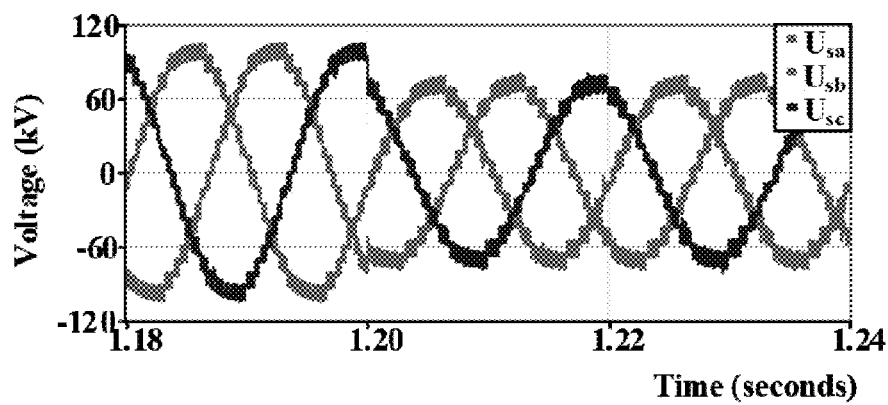
FIG. 30 is a graph showing an output voltage of a three phase HMMC during modulation index change, according to the embodiments as disclosed herein.
Figure 31:
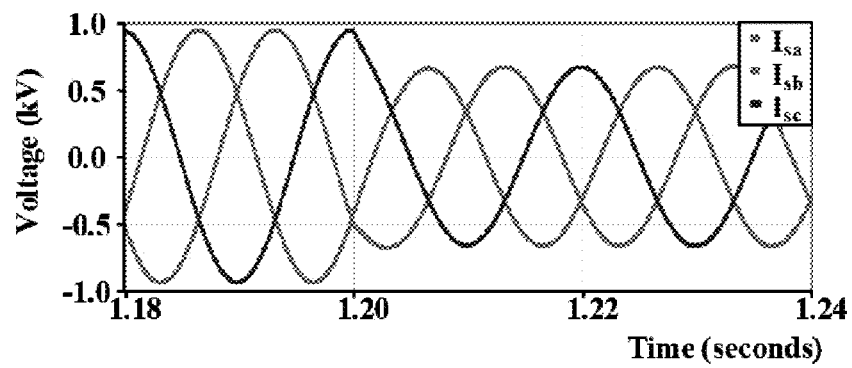
FIG. 31 is a graph showing an output current of the three phase HMMC during modulation index change, according to the embodiments as disclosed herein.

The results obtained from the proposed control method were found to be better than the exiting methods. The modulation index is changed from 1 to 0.7 at 1.2 seconds and results obtained are presented in FIGS. 27-31. The voltage generated by upper chain link $CL_{ux}$, lower chain links $CL_{lx}$ and parallel chain link $CL_{px}$ of the phase are shown in FIG. 27, FIG. 28, FIG. 29 respectively. The output voltage and current of the converter are shown in the FIG. 30 and the FIG. 31, respectively. The aforementioned method is considered as a sighting example. However, the proposed converter can be controlled using any other suitable control method.

In order to verify the working of the three phase HMMC 1100 as illustrated in the FIG. 14, the simulation model of three phase HMMC 1100 is built in the power systems computer-aided design (PSCAD). The simulation parameters used for the simulation model are summarized in Table 2. The model parameters listed in Table 2 are used for better illustration and validation. However, satisfactory results can be obtained from the HMMC 1100 designed with any other suitable set of parameters depending on the application. These parameters are just considered as an example case.

TABLE 2

Simulation parameters

| Serial number | Parameter | Value |
|---|---|---|
| 1 | DC link voltage | 200 kV |
| 2 | No. of HBSM per chain link | 5 (4 + 1 redundant) |
|   | Submodule capacitor voltage | 26.3 kV |
| 3 | Submodule capacitance | 0.8 mF |
| 4 | Arm inductance ($L_{x1}$, $L_{x2}$ and $L_{x3}$) | 1 mH |
| 5 | Load | R = 100 Ω |
|   |   | L = 100 mH |

Figure 32:
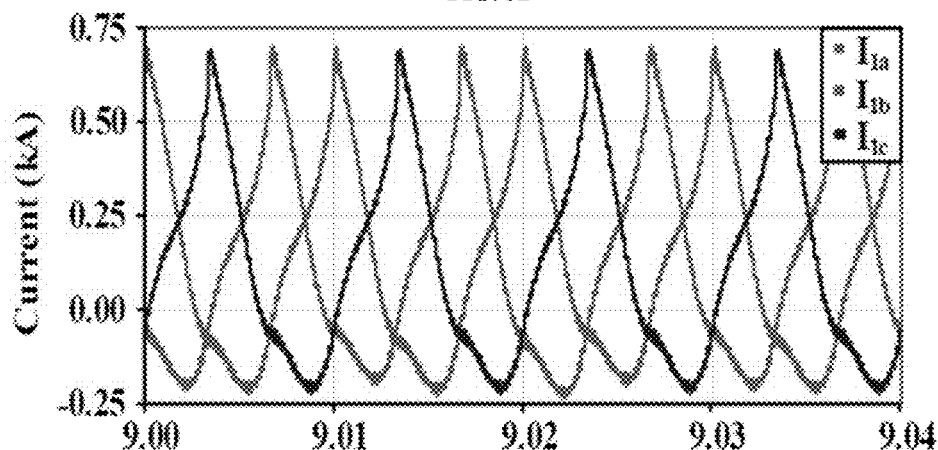
FIG. 32 is a graph showing the current flowing through a chain link 1, according to the embodiments as disclosed herein.
Figure 33:
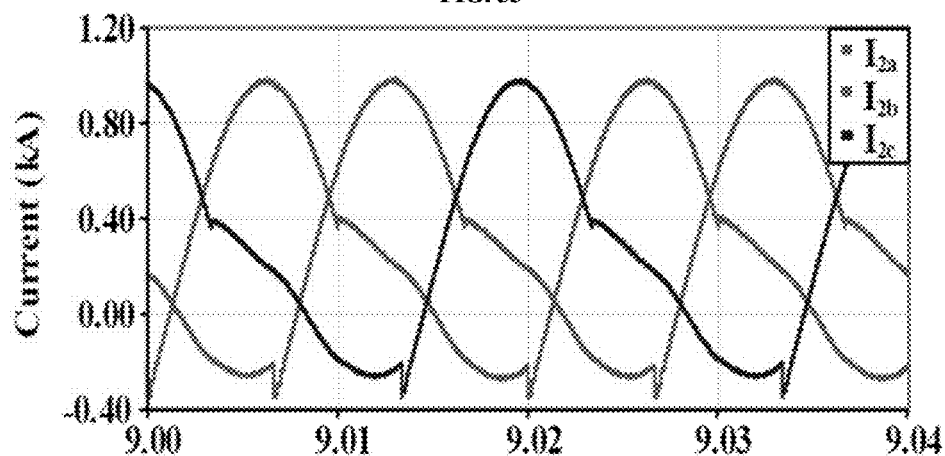
FIG. 33 is a graph showing the current flowing through a chain link 2, according to the embodiments as disclosed herein.
Figure 34:
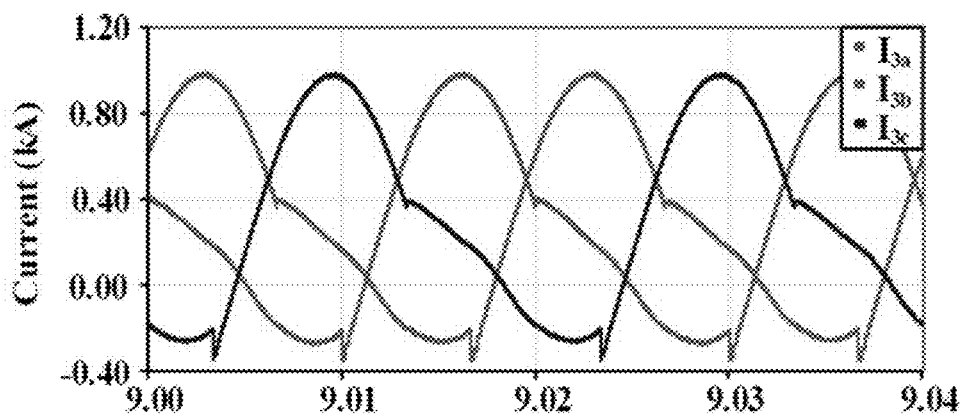
FIG. 34 is a graph showing the current flowing through a chain link 3, according to the embodiments as disclosed herein.
Figure 35:
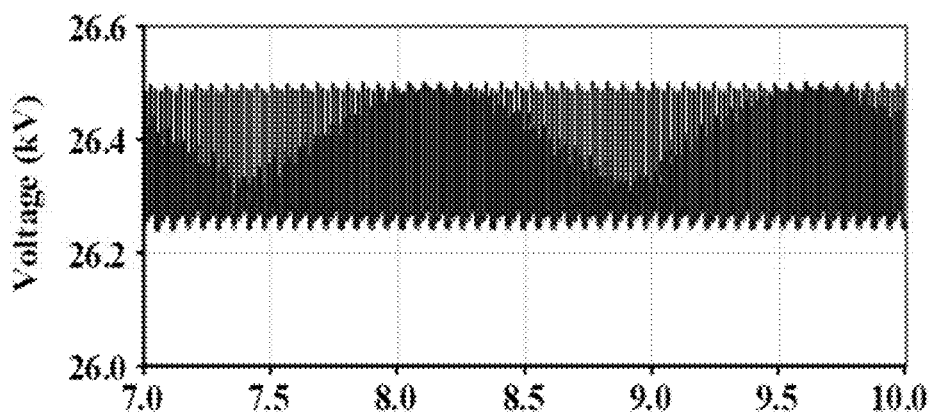
FIG. 35 is a graph showing the sub module capacitor voltage of the phase, according to the embodiments as disclosed herein.
Figure 36:
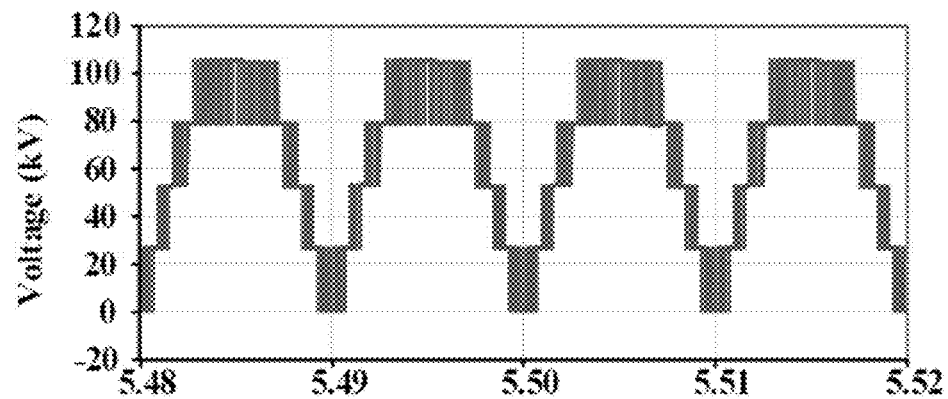
FIG. 36 is a graph showing the voltage generated by the chain link 1 of the phase, according to the embodiments as disclosed herein.
Figure 37:
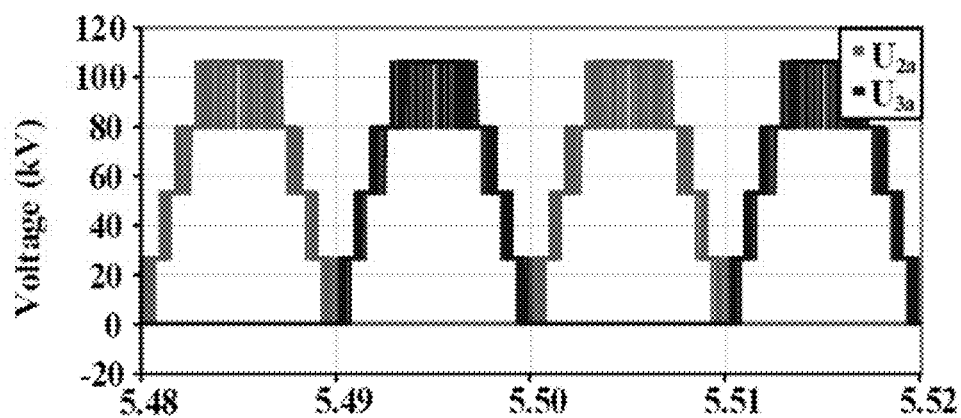
FIG. 37 is a graph showing the voltage generated by the chain link 2 and chain link 3 of the phase, according to the embodiments as disclosed herein.
Figure 38:
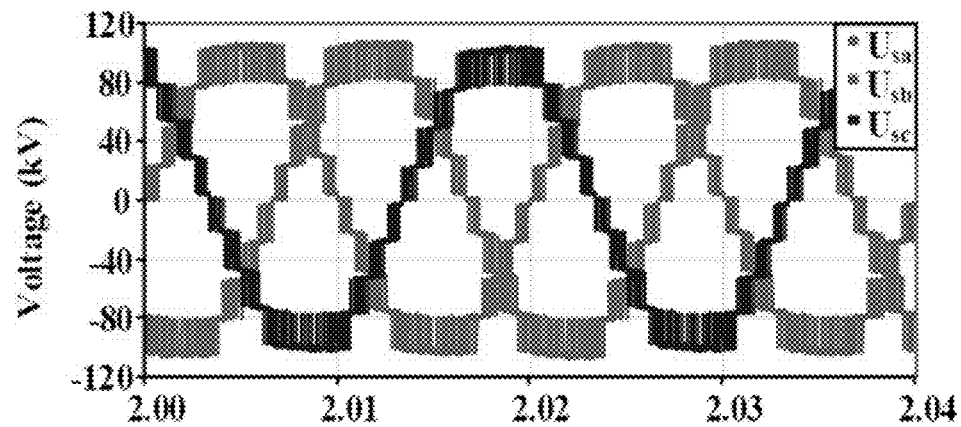
FIG. 38 is a graph showing the output voltage of a three phase HMMC, according to the embodiments as disclosed herein.
Figure 39:
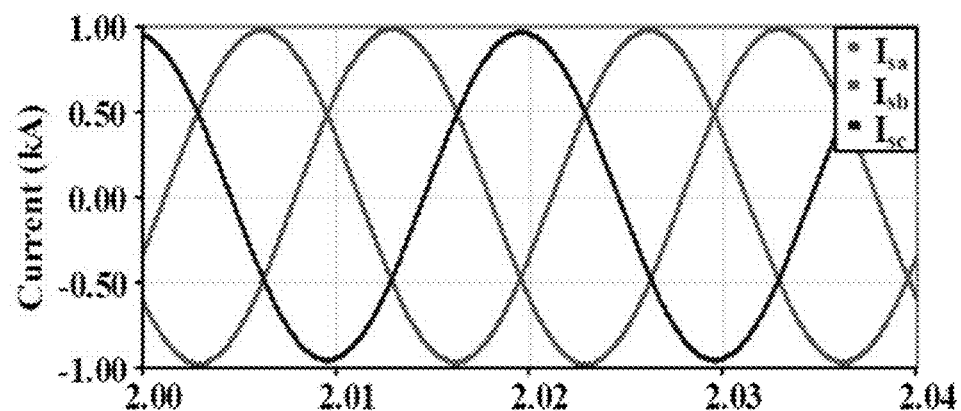
FIG. 39 is a graph showing the output current of the three phase HMMC, according to the embodiments as disclosed herein.

The current flowing through the chain link 1 $CL_{1x}$ is shown in FIG. 32. The current flowing through the chain link 2 $CL_{2x}$ and chain link 3 $CL_{3x}$ are shown in FIG. 33 and FIG. 34 respectively. The SMs capacitor voltages are shown in FIG. 35. The chain link 1 $CL_{1x}$ generates the absolute value of the output AC voltage in both the half cycles as shown in FIG. 36. The voltage generated by chain link 2 $CL_{2x}$ and chain link 3 $CL_{3x}$ of the phase is shown in FIG. 37. The chain link 2 $CL_{2x}$ and the chain link 3 $CL_{3x}$ generates absolute value in one half cycle and the zero voltage in other half cycle. The output voltage and the output current are shown in FIG. 38 and FIG. 39 respectively.

The aforesaid results are obtained by using standard third harmonic injection method. However, the proposed converters HMMC 1100 or 1200 can also be controlled using any other suitable control method.

Figure 40:
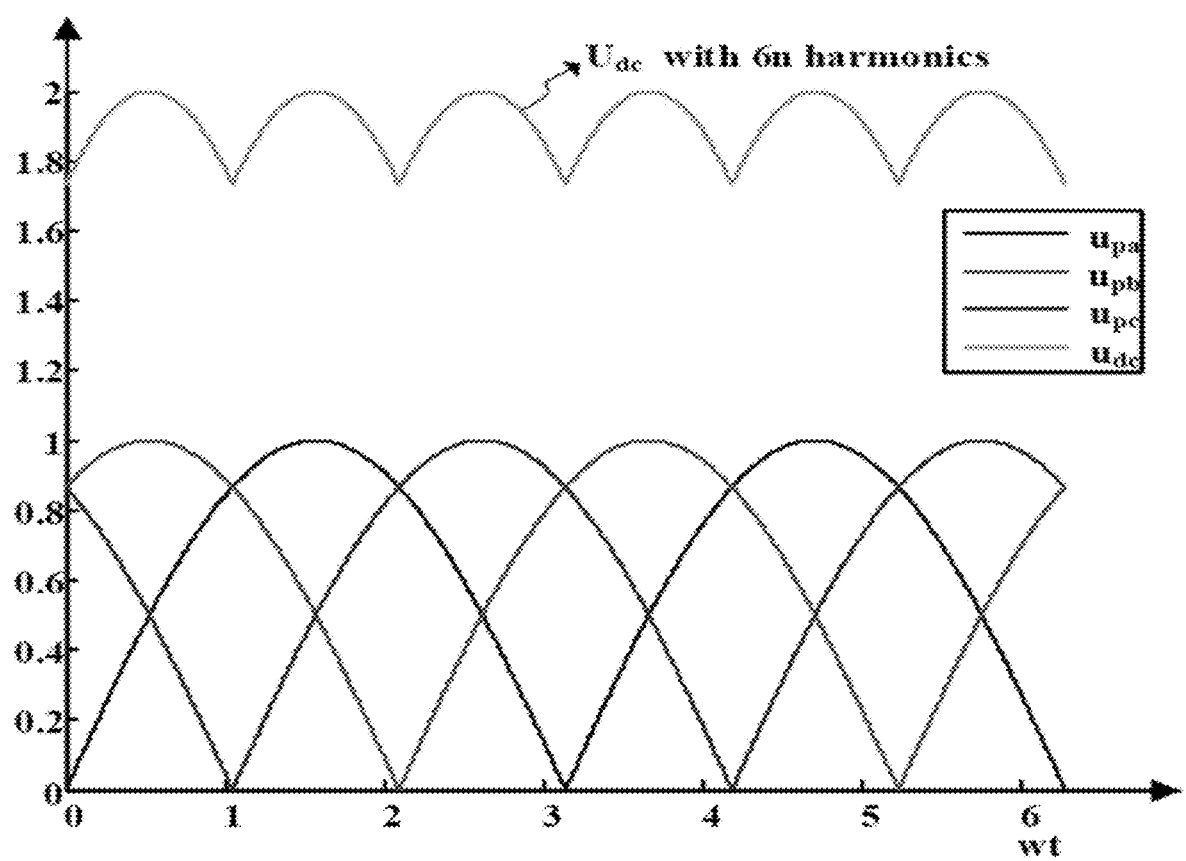
FIG. 40 is the graph showing 6n harmonics present in the dc link voltage, according to the embodiments as disclosed herein.

FIG. 40 is the graph showing 6n harmonics present in the DC link voltage, according to the embodiments as disclosed herein. In the proposed three phase HMMC 1000, the summation of the parallel chain link $CL_{px}$ voltage forms the DC link voltage ($u_{dc}=u_{pa}+u_{pb}+u_{pc}$). The DC side contains all the 6n (where n=1, 2, 3 . . . ) harmonics as shown in the FIG. 40, which results in higher ripple in the DC link voltage. The proposed method for eliminating all the 6n harmonics from the DC link voltage includes subtracting one third of the summation of all the 6n harmonics voltages from each parallel chain link reference voltage (i.e., $u_{px}=|u_{sx}|-\{\Sigma$ 6n harmonics voltages/3$\}$, considering HMMC 1000 as an example).

In the positive half cycle, the lower chain link $CL_{lx}$ is used to modify the voltage generated by the parallel chain link $CL_{px}$ into a pure sine wave (i.e., the lower chain link $CL_{lx}$ generates {$\Sigma$ 6n harmonics voltages/3}) and upper chain link $CL_{ux}$ is used to generate the rectified sine wave required across the output of the three phase HMMC 1000. Similar steps are repeated in the negative half cycle. Hence, the DC link voltage obtained by using the proposed method is ripple free besides providing two parallel paths for the current. The above method can be easily extended to the proposed three phase HMMC 1100 and 1200.

The model parameters listed in Table 1 and 2 are used for better illustration and validation. However, satisfactory results can be obtained from the HMMC 1000, HMMC 1100 or HMMC 1200 designed with any other suitable set of parameters depending on the application. These parameters are just considered as an example case.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A converter, comprising:
   at least two switching segments;
   at least three or more groups of sub modules;
   a plurality of inductors arranged in each of the groups of the sub modules to limit circulating current among the groups of the sub modules;
   wherein the at least one groups of sub modules is connected between two nodes of a dc link;
   wherein the other two groups of sub modules are connected between the node of the dc link and a first ac node;
   wherein each of the two switching segments are connected between the two nodes of the dc link;
   wherein a node between the two switching segments forms a second ac node;
   three phases,
   wherein each of the three phases are connected in hybrid configuration of series and parallel across the two nodes of the dc link;
   wherein the groups of the sub modules are controlled in such a way that at least two groups of the sub modules generate voltage for a half cycle of ac voltage across the first ac node and the second ac node;
   wherein the at least one switching segment conducts for the half cycle of ac voltage and is bypassed during the other half cycle of the ac voltage.

2. The converter of claim 1, wherein the sub modules comprises at least one of a direct current source and a storage element, and wherein the sub modules comprises at least one of a direct current source and a storage element.

3. The hybrid modular multilevel converter of claim 1, wherein the at least three or more groups of sub modules generate a near sinusoidal output voltage, wherein the group of sub modules will support a DC link voltage during hybrid configuration.

4. The converter of claim 1, wherein the at least one group of sub modules in each phase are used for dc side voltage ripple minimization while the remaining groups of sub modules are used to generate a rectified sine wave required across an output during hybrid configuration.

* * * * *